United States Patent [19]

Johnson

[11] Patent Number: 4,860,408
[45] Date of Patent: Aug. 29, 1989

[54] CARGO STRAP

[76] Inventor: Brian K. Johnson, 11 Hammond St., Somerville, Mass. 02143

[21] Appl. No.: 111,485

[22] Filed: Oct. 16, 1987

[51] Int. Cl.$^4$ .............................................. F16G 11/00
[52] U.S. Cl. ................................ 24/68 CD; 24/300; 24/122.3
[58] Field of Search ................ 24/300, 301, 302, 298, 24/17 AP, 68 CD, 68 CT, 71.2, 122.3; 152/217

[56] References Cited

U.S. PATENT DOCUMENTS

| | | |
|---|---|---|
| 377,027 | 1/1988 | Green, Jr. et al. . |
| 562,114 | 6/1896 | Benford .................................. 24/300 |
| 821,829 | 5/1906 | Porter .................................. 24/122.3 |
| 1,050,442 | 1/1913 | Frissell . |
| 1,454,253 | 5/1923 | Rissman ................................ 24/122.3 |
| 1,679,822 | 8/1928 | Hall . |
| 2,207,043 | 7/1940 | Weiss et al. ......................... 24/122.3 |
| 2,298,851 | 10/1942 | Wachter ............................ 24/68 CT |
| 2,609,081 | 9/1952 | Hapman ............................ 24/122.3 |
| 2,820,269 | 1/1958 | Wolff ................................ 24/300 |
| 2,852,827 | 9/1958 | Arnold ............................ 24/68 CT |
| 2,865,978 | 12/1958 | Modrey . |
| 2,919,946 | 1/1960 | Miener ............................ 24/301 |
| 3,174,787 | 3/1965 | Kolman ............................ 24/300 |
| 3,197,240 | 7/1965 | Lindberg . |
| 3,673,642 | 7/1972 | Harwell .......................... 24/68 CD |
| 3,718,947 | 3/1973 | Huber ............................ 24/298 |
| 3,813,733 | 6/1974 | Flohr . |
| 3,859,692 | 1/1975 | Waterman et al. . |
| 4,058,291 | 11/1977 | Schreyer et al. ................ 24/68 CD |
| 4,177,541 | 12/1979 | Seakan ............................ 24/122.3 |
| 4,505,465 | 3/1985 | McCrary .......................... 24/68 CT |
| 4,694,541 | 9/1987 | Skyba ............................. 24/301 |

FOREIGN PATENT DOCUMENTS 1028058 5/1953 France ................................ 24/300

Primary Examiner—Victor N. Sakran
Attorney, Agent, or Firm—Pollock, Vande Sande & Priddy

[57] ABSTRACT

A stretchable, flexible cargo strap assembly comprises an elongated, stretchable first member having the properties of generating restoring force when stretched from a relaxed condition to a tensioned condition, and an elongated second member having a portion which coextends with at least a portion of the first member. The second member is secured to the first member by a plurality of securing members distributed at two or more longitudinally spaced locations along the coextending portions of the first and second members and intermediate the ends of said members, for substantially inhibiting or limiting relative longitudinal movement of the first and second members at these locations while providing for such movement between these locations. The second member is extendable, by stretching of the assembly, to an extended position in which the end-to-end distance of the second member is at least about 1.2 times the end-to-end distance which the second member exhibits when the assembly is in an unstretched condition, and develops a greater resistance to extension than said first member, but only after extension at least to this extended position.

75 Claims, 6 Drawing Sheets

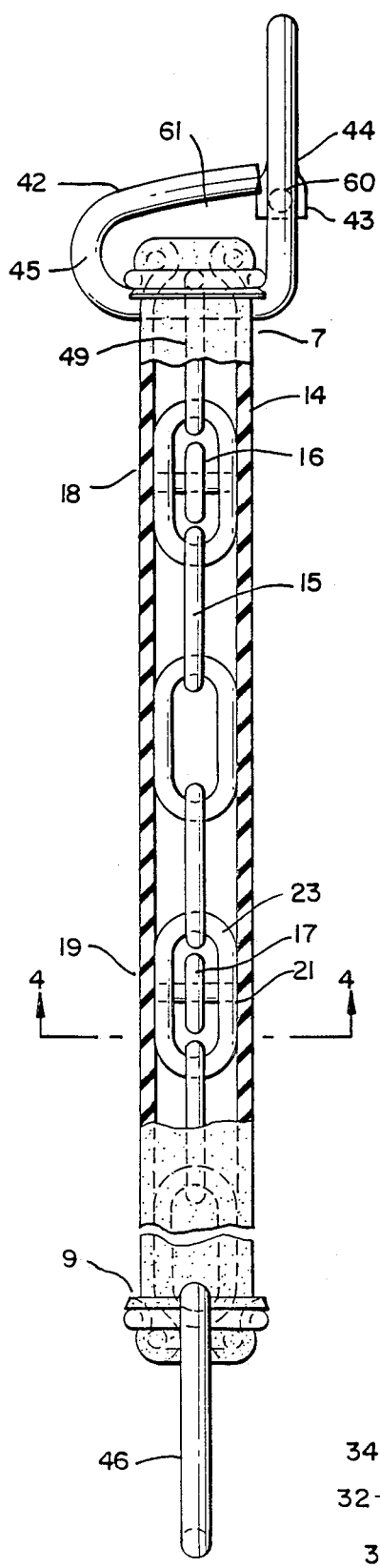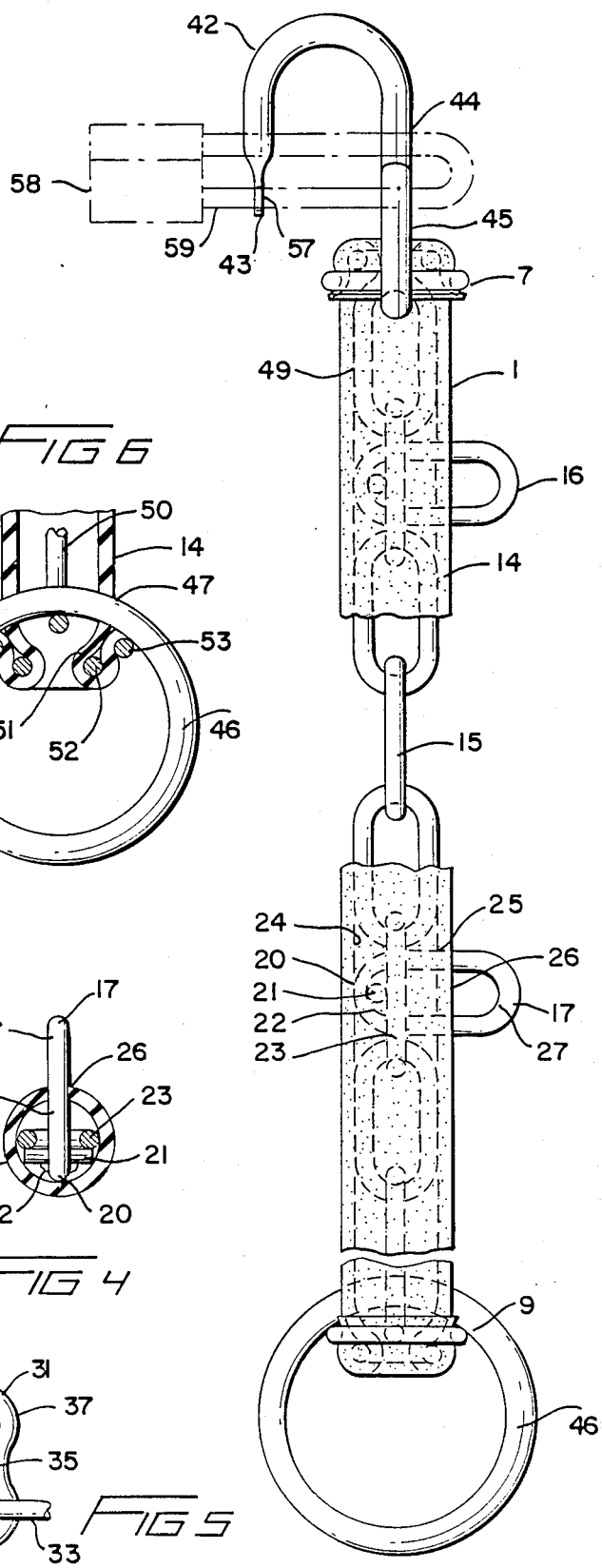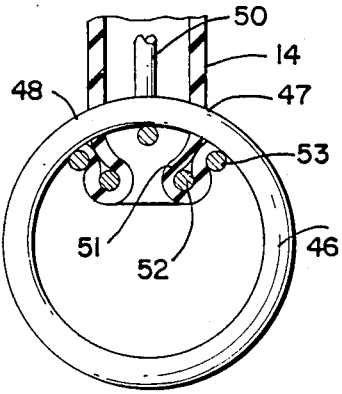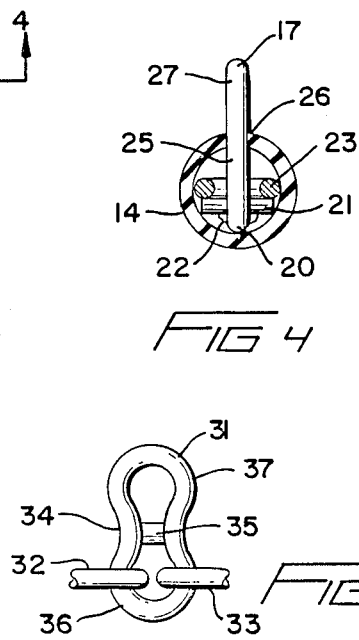

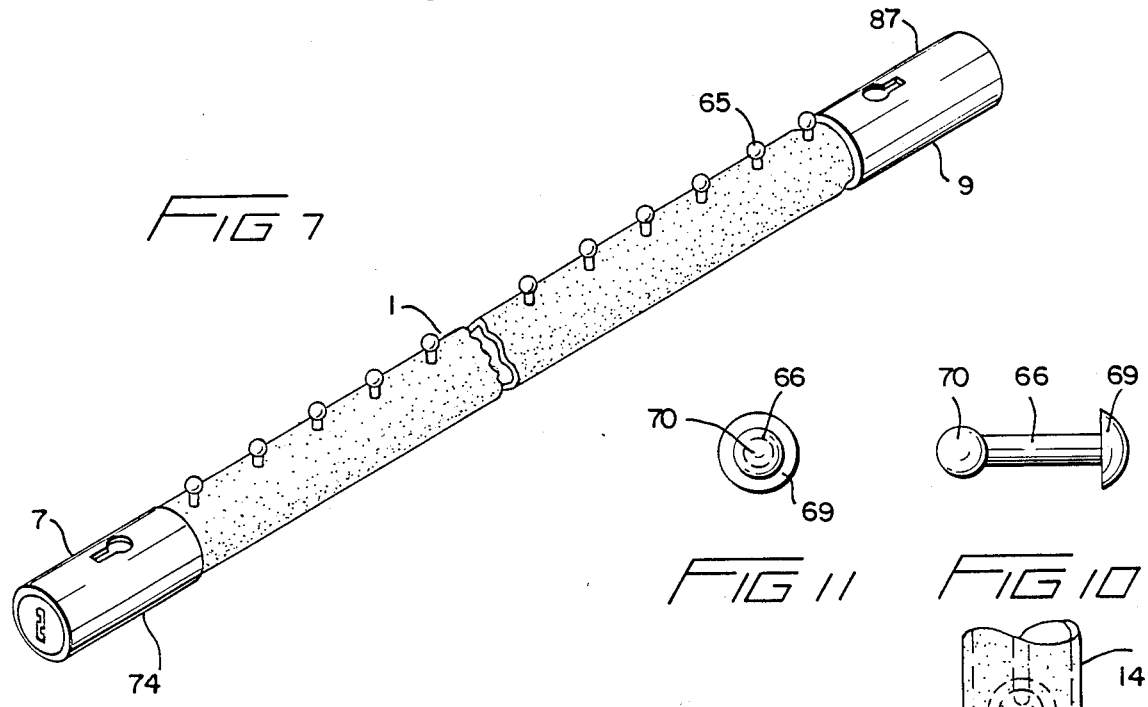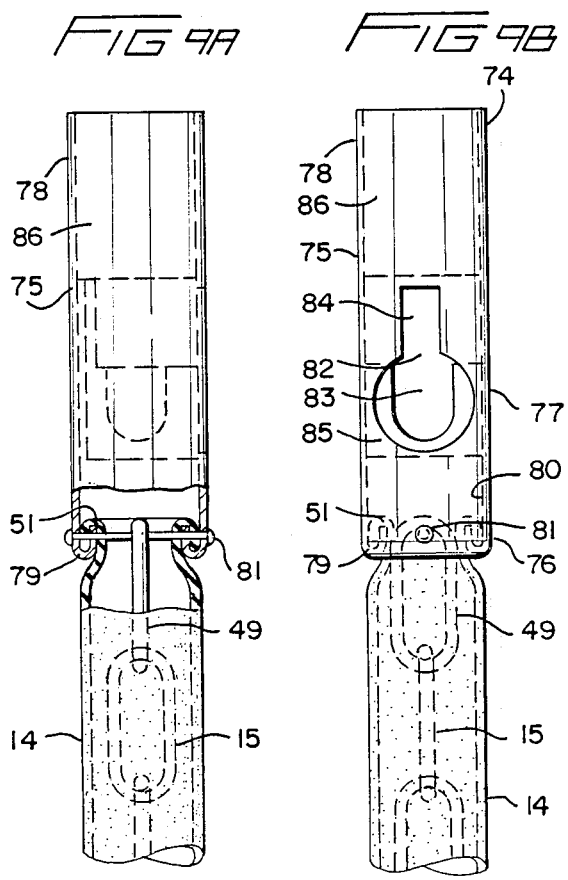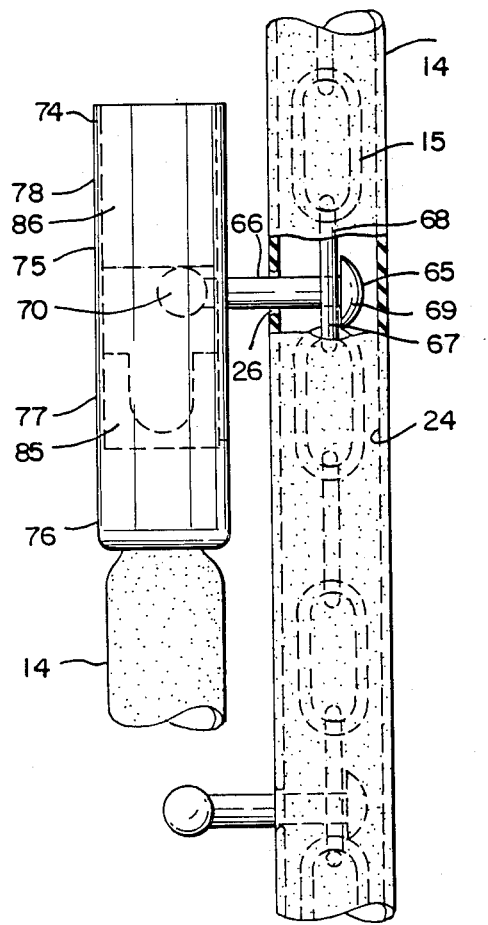

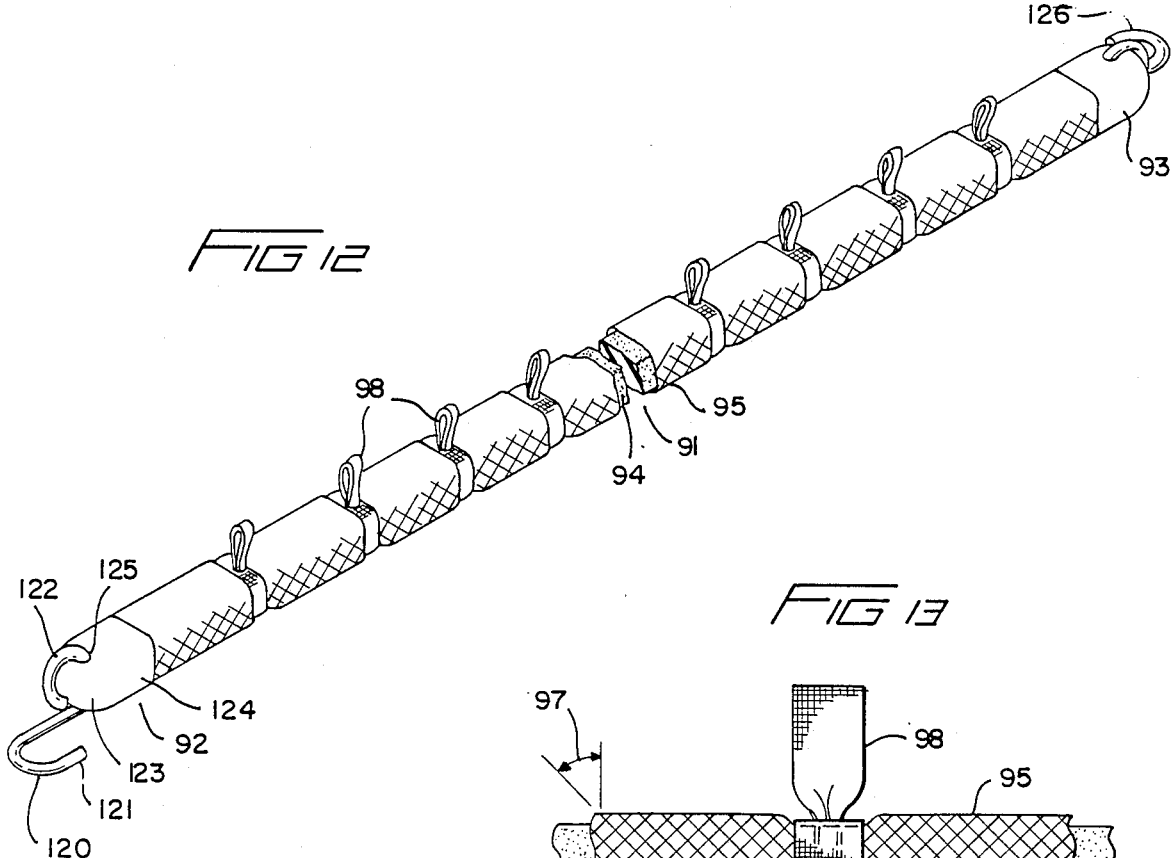
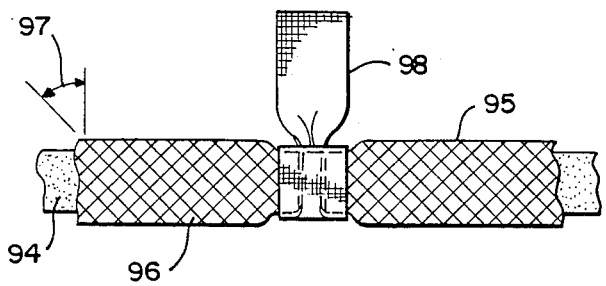
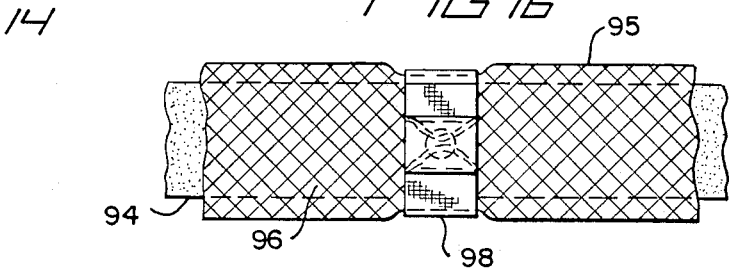
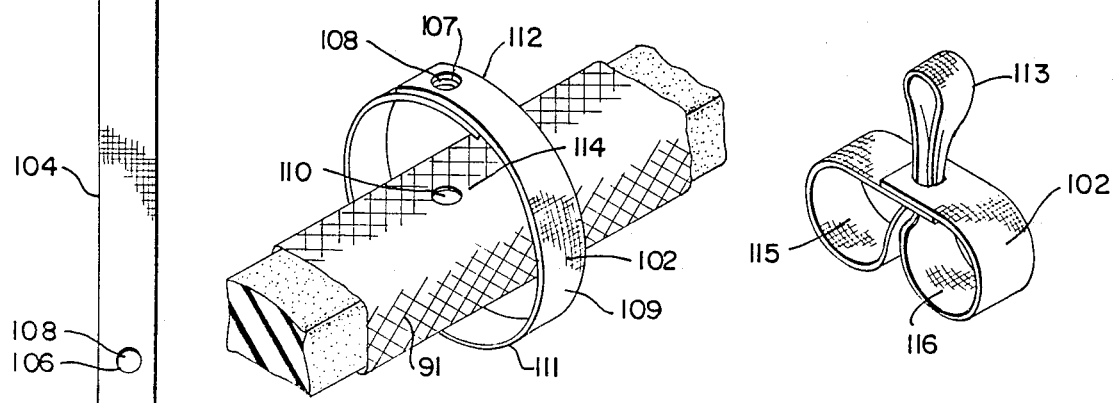

CARGO STRAP

TECHNICAL FIELD

The present invention relates to cargo straps capable of performing a cargo binding function, such as binding a cargo object together or to another object. For example, the cargo strap may be used to secure various objects, such as surfboards, sailboards or the like, to a car top carrier.

BACKGROUND OF THE INVENTION

Several types of stretchable cargo straps are known and have been widely used in both light- and heavy-duty applications. For example, light-duty cargo straps have been employed to hold miscellaneous small articles in place on the luggage carriers of bicycles. Somewhat heavier duty cargo straps have been employed to secure a wide variety of articles, such as skis, surfboards, sailboards, other small craft, ladders, pipes, lumber and various other materials to car top carriers and to the overhead racks of pickups and other vehicles. Even heavier straps, referred to as "bungee cords" have been employed to secure aircraft to the decks of aircraft carriers.

These stretchable, flexible cargo straps generally comprise an elongated, stretchable first member, such as a band of rubbery elastomer material having a rectangular, circular or other cross-section and composed of one or more strands of the elastomeric material. Typically an attachment means such as a hook is provided as each end of the band, by means of which the strap may be hooked to the cargo object, to another object or to itself. For example, in employing such a strap it is a common practice to pass the center portion of the strap over a cargo object while passing the ends of the strap around a fixed support and then hooking on to the center portion of the strap with the hook. In some embodiments, the band of elastomeric material is provided with a close fitting outer layer woven of threads or filaments to protect the band against abrasion.

Such cargo straps have been subject to important limitations or difficulties which have been recognized for many years. For example, these cargo straps are subject to breakage with resultant damage to or loss of the cargo object as a result of over-stressing or aging of the elastomeric material. Where the cargo object is one of substantial value, such as for example a surfboard or sailing board which is attached to a car top carrier on a fast moving vehicle, the resulting damage can be catastrophic if the breakage of the strap results in the watercraft separating from the vehicle. Such occurrences also result in significant hazards, with attendant property damage and the potential for serious injury to the occupants of following vehicles.

Another difficulty exists in relation to the practice of passing the hook on such a cargo strap around a support and then hooking the hook to the central portion of the cargo strap. Because the hook has the ability to slide along the central portion of the cargo strap to which it is hooked, it is difficult to maintain the desired amount of restoring force in the cargo strap if the strap happens to be somewhat longer than the minimum length required to pass over or around the cargo object.

Still another difficulty lies in the fact that typically, cargo straps do not provide any significant degree of security against theft of the cargo object. This is a particularly serious shortcoming where it is desired to use such a strap to bind valuable property to an exterior carrier, such as a car or truck top carrier.

The longstanding nature of these problems and the minimal changes that have occurred in cargo straps over a period of many years stand as mute testimony to the fact that practical and economic solutions to these problems have not been obvious. The present invention is aimed at providing solutions to any or all of the foregoing problems, and also provides additional solutions and advantages discussed below.

SUMMARY OF THE INVENTION

The present invention is directed to a stretchable, flexible cargo strap assembly which, in common with previously known cargo straps, comprises an elongated, stretchable first member. As in prior cargo straps this first member has the property of generating restoring force when stretched from a relaxed condition to a tensioned condition. Such first member also has the property of generating, without exceeding its breaking elongation (as manufactured), an amount of such force which is sufficient for performing a cargo binding function, including binding a cargo object together or to another object.

In accordance with the invention, the cargo strap assembly also comprises an elongated second member having certain characteristics which are applicable within at least a portion of its length and preferably throughout its length. More particularly, the elongated second member coextends with at least a portion of the first member and is secured to the first member by a plurality of securing members distributed at two or more longitudinally spaced locations along the coextending portions of the first and second members intermediate the ends of said members. The second member is secured to the first member in the foregoing manner for substantially inhibiting or limiting relative longitudinal movement of the first and second members at the abovementioned locations while providing for such movement between such locations. This second member is extendable, by stretching of the assembly, to an extended position in which the assembly is stretched sufficiently for performing the cargo binding function. In this extended position the end to end distance of the second member is at least about 1.2 times the end-to-end distance which the second member exhibits when the assembly is in an unstretched condition. Finally, the second member develops a greater resistance to extension than the first member, but only after extension of the assembly at least to said extended position.

Moreover, the invention includes certain further improvements, all of which can be used singly or in any operative combination with one another and with the subject matter of the preceding paragraphs.

Some of these further improvements are described in the paragraphs which follow, and additional such improvements are discussed below under the heading "Description of Various and Preferred Embodiments."

For example, in a preferred embodiment, the invention is directed to cargo strap assemblies: which (as manufactured) will stretch to at least about 1.2 times its unstretched length when stretched by a force of 16 Kg., without breaking; and/or in which the first member, when stretched to 1.4 times its unstretched length, will generate a restoring force in the range of about 5 to about 50 Kg.; and/or in which the first member has a breaking elongation (as manufactured) which is about 1.5 or more times its length in relaxed condition; and/or in which the assembly has a breaking force (tensile, as manufactured) of at least about 30 Kg., and/or in which all or any combination of the foregoing properties or more preferred values thereof are present.

According to the invention, the first member may be in the form of a band, more preferably in the form of a tube and irrespective of its form is preferably formed of rubbery, elastomeric material.

Preferably, the cargo strap assembly includes a second member which is a metal or polymeric member that possesses substantially greater strength and resistance to elongation than the first member. Moreover, the second member may take various forms, including that of a rope, a chain, or a woven tubular member having helically woven filaments (including threads or monofilaments) which afford extension of the second member by a change in the helix angle of the filaments.

While all or a portion of the second member coextends with at least a portion of the first member, the proximity of the members and the directions of the paths which they follow may vary in some degree. Preferably, the first and second members are held in close lateral proximity at least in a plurality of spaced positions distributed along their respective lengths. However, the second member may have portions which are laterally spaced from the second member in intervals of longitudinal space between the securing members, as will be illustrated below. However, it is preferred that the first and second members, in a portion of the assembly which is of sufficient length to perform a cargo binding function, should have a lateral spacing which is maintained as a small fraction of that length, along said portion. For example, throughout such portion the first and second members may be maintained sufficiently close together so that their lateral spacing, if any, is about 0.15 or less of the total length of said assembly. In particularly preferred embodiments, the first and second members extend in substantially the same direction over a major portion of the length of the assembly. In those embodiments considered best, the first and second members follow paths which are maintained in close proximity to one another substantially throughout the length of the assembly.

The foregoing categories of coextension can be embodied in varying ways. For example, the second member may extend alongside of but does not surround the portion of the first member with which it coextends; for example the second member may be a rope or chain which extends alongside of an elastomeric band constituting the first member, as will be disclosed in the drawings which are described below. On the other hand, the second member may surround the portion of the first member with which it coextends, such as when the first member is surrounded by a woven tubular member which is extendable in the manner described above. According to a particularly preferred embodiment, the second member is surrounded by the portion of the first member with which it coextends, including for example those embodiments described below wherein the second member is an elastomer tube surrounding a chain or other means acting as the second member.

The securing means may take a wide variety of forms. Preferably, the securing means are fasteners which extend laterally through the first member and preferably also through the second member. In one embodiment the securing means are protuberances on an outer surface of the first member, which do not extend through the first member but do project a sufficient distance laterally from the surface of the first member for engaging an inner surface of the second member for substantially inhibiting or limiting relative longitudinal movement of the first and second members at said locations in the event of rupture of the first member intermediate an adjacent or non-adjacent pair of said protuberances. Such movement is inhibited at the locations of the securing means in the event of rupture of the first member intermediate a pair of securing means. Preferably said protuberances are integral with the first member and, in the absence of compression of the first member by the second member, project a sufficient distance from the surface of the first member for engaging the inner surface of the second member.

The foregoing example of securing means can for example be applied in a cargo strap assembly in which the second member is a woven tubular member that surrounds the portion of the first member with which it coextends. The second member has helically woven filaments which afford longitudinal extension of the second member by a change in the helix angle of the filaments and an accompanying contraction of the inner surface of the tubular member.

According to another preferred embodiment the securing means include loops, these loops may for example be closed loops which pass through and surround the first and second members. According to a particularly preferred embodiment, these loops have free looped ends extending from an outer surface of the assembly. The closed loops may for example be continuous bands or elongated non-continuous bands having first and second portions joined together in overlapping relationship to form said loops. When non-continuous bands are used the free looped ends may extend through apertures in the overlapping first and second portions of said bands to assist in alignment of the loop ends.

According to another preferred embodiment the securing means are members which extend laterally from the second member through apertures formed in the first member. The securing means may for example be metallic loops. A particularly preferred embodiment having laterally extending securing means involves using a chain as a second member and surrounding it with a first member, e.g, an elastomeric tube, in which case the securing means may be chain links which extend laterally through apertures formed in the first member. In such circumstances, the securing means may be links of said chain or chain links secured to said chain.

The number of securing means employed may vary, but preferably will include three or more securing means, preferably four or more and most preferably five or more. According to a preferred embodiment, at least a portion of the securing means are distributed at substantially uniform distance intervals along the length of the coextending portions of the first and second members. More preferably, all of the securing means are distributed at substantially uniform distance intervals along the length of the coextending portions of the first and second members. According to one specific embodiment, at least a portion of the securing means are distributed along the length of the coextending portions of the first and second members in a ratio of about 1 to about 4 securing means per 20 cm of length of said coextending portions. More preferably, the securing means are distributed along the length of the coextending portions in a ratio of about 1 securing means per 10 cm of length.

As indicated above, the second member is extendible. Preferably the extendible property of the second member includes the capability of undergoing, in the assembly, an increase in distance between the ends of the second member by straightening, stretching and other modes of increasing the end-to-end distance of the second member, as measured along the path occupied by the assembly. While the overall length of the assembly may be any length suitable for a cargo binding function, the overall length of the assembly, in its unstretched condition is generally in the range of about 0.25 to about 4 meters, preferably about 0.25 to about 2 and still more preferably about 0.5 to about 1.25 meters. While the assembly may be designed for varying amounts of extension, it is preferred that the second member be extendable to an extended position in which the end-to-end distance of the second member is in the range of about 1.2 to about 2.2, more preferably about 1.3 to about 2, and still more preferably about 1.5 to about 1.9 times the end-to-end distance which the second member exhibits when the assembly is in an unstretched condition.

The materials of construction of the first and second members may be selected, and their positions and arrangement within the assembly may be so designed, that the second member will tend to protect the first member against breakage. This may be accomplished for example, where the second member is arranged to develop a greater resistance to extension than the first member before the first member exceeds its breaking elongation (as manufactured).

According to another preferred embodiment of the invention, the cargo strap includes at each end thereof attachment means for securing the cargo strap to itself or to another object. The attachment means may take varying forms such as a hook, a keyed or combination lock or means for applying such a lock to the attachment means and for preventing removal of the attachment means without opening the lock. The attachment means, regardless of its form, may be mounted by direct connection to an end of the first member, or to an end of the second member, or preferably to ends of both the first and second members.

According to a particularly preferred embodiment, as will be illustrated below, the attachment means is connectable to the securing means for attaching one or both ends of the strap to selected locations on the strap intermediate its ends. In a particularly preferred embodiment of this aspect of the invention, the securing means include loop members extending from an outer surface of the assembly and the attachment means is selectively connectable to said loop members. In a more preferred form of this aspect of the invention the aforementioned loop members include chain links extending through the outer surface of the assembly and said attachment means is selectively connectable to said links for attaching the strap to itself. In yet another preferred embodiment the securing means include knobbed shanks extending through the outer surface of the assembly and said attachment means is selectively connectable to said knobs for attaching the strap to itself.

BRIEF DESCRIPTION OF THE DRAWINGS

FIG. 2 is an enlarged, fore-shortened side view, with a portion broken out, of the cargo strap assembly of FIG. 1.

FIG. 3 is a side view of the cargo strap assembly of FIG. 2, partly in section, with the assembly rotated 90° about its longitudinal axis from the position shown in FIG. 2.

FIG. 4 is a transverse cross-section taken on section line 4—4 of FIG. 3.

FIG. 5 is a side view of a portion of a substitute form of chain for use in the embodiment of FIGS. 2 and 3.

FIG. 6 is an enlarged portion of the lower end of FIG. 2, partly in section.

FIG. 7 is a perspective view of another embodiment of the cargo strap assembly of the present invention.

FIG. 8 is a partial view, partly in section, of the cargo strap assembly of FIG. 7, and shows the attachment means at the end of the assembly being connected to securing means at an intermediate portion of the assembly.

FIG. 9A shows the attachment means of FIG. 8 and the ends of the first and second members attached thereto, portions being shown in cross-section.

FIG. 9B shows the attachment means and first and second members of FIG. 9A rotated 90° about their longitudinal axes.

FIG. 10 is a side view of a portion of the securing means of FIG. 8.

FIG. 11 is a top view of the securing means of FIG. 10.

FIG. 12 is a perspective view of still another embodiment of the cargo strap assembly of the present invention.

FIG. 13 is a side view of an enlarged portion of FIG. 12.

FIG. 14 is a top plan view of a non-continuous fabric band used in forming the securing means for the embodiment of FIG. 12.

FIG. 15 is a perspective view showing the band of FIG. 14 formed into a ring and surrounding a portion of the first and second members employed to fabricate the cargo strap assembly of FIG. 12.

FIG. 16 is a bottom view of the apparatus of FIG. 13.

FIG. 17 is a perspective view of the securing means of FIGS. 13 and 16 separated from the remainder of the cargo strap assembly.

DESCRIPTION OF VARIOUS AND PREFERRED EMBODIMENTS

FIGS. 1–6

Figure 1:
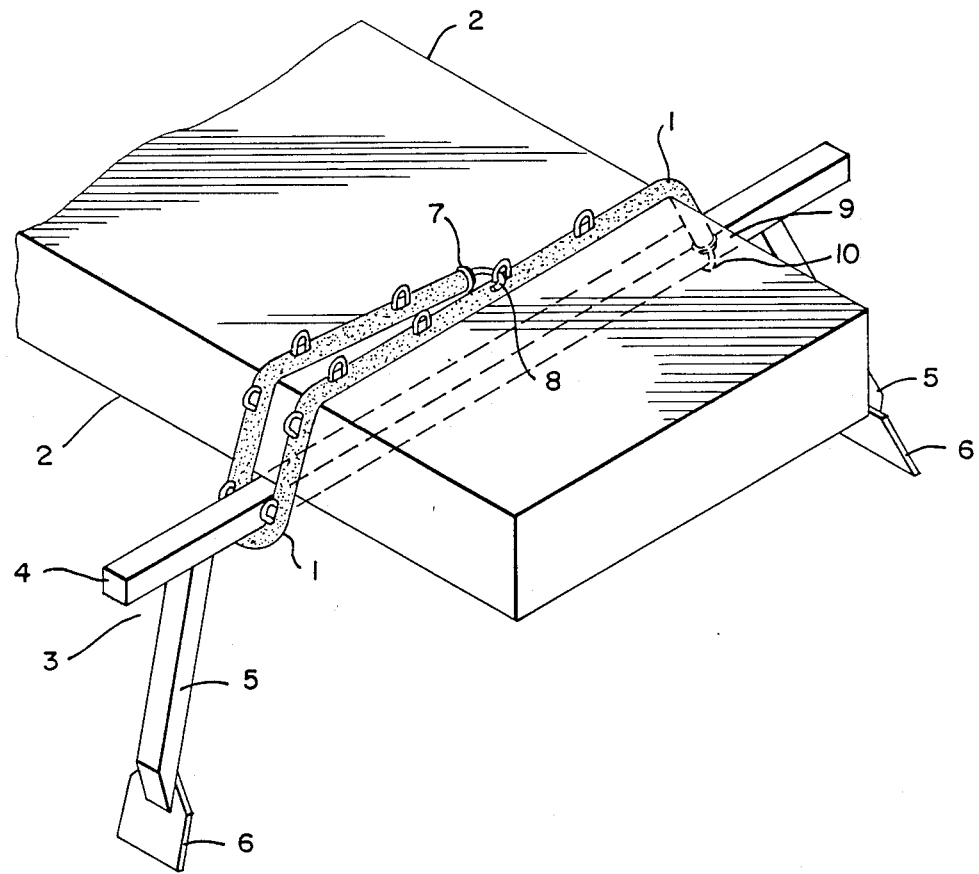
FIG. 1 is perspective view of a cargo strap assembly, cargo and a roof top carrier for application to a road vehicle (not shown).

One of many possible embodiments of the invention is disclosed in FIGS. 1–6, FIG. 1 being a perspective view of a cargo strap assembly 1 (shown in greater detail in FIGS. 2–6) binding cargo, e.g. a box 2, to a conventional roof top carrier 3 of the type which may be secured to the roof of a highway vehicle such as a passenger car (not shown). Carrier 3 includes horizontal load bar 4 to which is attached a pair of generally upright supporting legs 5 having support pads 6 at their lower ends. These support pads may be equipped with any suitable type of clamping means (not shown) for securing the support pads to the roof of the vehicle. Cargo strap assembly 1 has a first end 7 at which is located a first attachment means (shown in greater detail in FIGS. 2–6) as well as a second end having second attachment means.

FIG. 2 shows cargo strap assembly 1 of FIG. 1 on a larger scale to provide additional detail. In order that both the first end 7 and second end 9 of assembly 1 can both be shown in the same Figure and on the same sheet of drawings, the assembly has been foreshortened in FIGS. 2 and 3.

Among the preferred embodiments of the cargo strap assembly of the present invention are those in which the user-stretchable portions of the assembly, in its unstretched condition, have an overall length which is preferably in the range of about 0.25 to about 4, more preferably about 0.25 to about 2 and still more preferably about 0.5 to about 1.25 meters. The preferred values of stretch capability of the cargo strap assembly (as manufactured) include a capability of stretching to at least about 1.2, more preferably at least about 1.5 and still more preferably at least about 1.8 times its unstretched length when stretched by a force of 16 kilograms, without breaking.

Each of the embodiments of the invention includes an elongated stretchable first member. Whatever form it takes, this first member will have the properties of generating restoring force when stretched from a relaxed condition to a tensioned condition, and generating, without exceeding its breaking elongation (as manufactured), an amount of such force which is sufficient for performing a cargo binding function, including binding a cargo object together or to another object. Preferred values for the restoring force include a capability, in said first member, when stretched to 1.4 times its unstretched length, of generating a restoring force in the range of about 5 to about 50 kilograms, more preferably about 8 to about 30 kilograms and still more preferably about 12 to about 22 kilograms. It is also preferred that the first member have a breaking elongation (as manufactured) which is about 1.5 or more, more preferably about 2.0 or more and still more preferably about 2.5 or more times its length in relaxed condition. Among the preferred first members are those in which the breaking force (tensile, as manufactured) is at least about 30, more preferably at least about 50 and still more preferably at least about 80 kilograms.

The first member may be formed of any suitable material with any suitable shape and transverse cross-section, including circular, oval, rectangular and other shapes. However, the most preferred forms of first member are elastomeric bands or tubes, especially those of circular or rectangular transverse cross-section, of rubbery material, such as natural or synthetic rubber, or elastomeric urethane polymer. For the embodiment of FIGS. 1–6, the most preferred form of first member is an EPDM rubber tube of circular cross-section having the above-described physical properties.

The elongated second member, whatever form it takes, will have a portion which co-extends with at least a portion of the first member, but the first and second members need not be coextensive throughout the entire length of each. Moreover, the second member is extendible, by stretching of the assembly, to an extended position in which the assembly is stretched sufficiently for performing a cargo binding function, and the end-to-end distance of the second member is at least about 1.2 times the end-to-end distance which the second member exhibits when the assembly is in an unstretched condition. Also, when stretched to its extended position, the second member develops a greater resistance to extension than the first member, but only after extension at least to said extended position. According to the most preferred embodiments of the invention, the foregoing extendible property of the second member includes the capability of undergoing, in the assembly, an increase in distance between the ends of the second member by straightening, stretching or other modes of increasing the end-to-end distance of the second member, as measured along the path occupied by the assembly. Preferably, in the extended position, the end-to-end distance of the second member is in the range of about 1.2 to about 2.2, more preferably about 1.3 to about 2.0 and still more preferably about 1.5 to about 1.9 times the end-to-end distance which the second member exhibits when the assembly is in an unstretched condition.

According to one particularly preferred embodiment of the invention, the second member protects the first member against breaking. This is accomplished by causing the second member to develop a greater resistance to extension than the first member before the first member exceeds its breaking elongation (as manufactured).

The second member may also take a variety of forms. Especially preferred are those members which possess substantially greater strength and resistance to elongation than the first member, and such members may for example include ropes, chains and woven tubes of any suitable cross-section, including circular, oval, rectangular, or other shapes. Metallic, polymeric (including especially rigid synthetic resinous) or other materials may readily be employed. For the embodiment of FIGS. 1–6, the most preferred form of second member is the metal chain 15 of FIGS. 2–6 which imparts the above-described properties to the assembly and preferably has links that are open and unobstructed, with the possible exceptions shown hereinafter.

In FIGS. 2–6, the assembly 1 and tube 14 are shown in tensioned condition with the tube surrounding chain 15 in close fitting engagement therewith, the chain being in its fully extended condition, i.e. extended to its full length. When the tube 14 is intact and returns to relaxed (unstretched) condition, individual lengths of chain 15 telescope with adjoining lengths within the tube, decreasing the distance (end-to-end distance) between the ends of the chain.

In common with other embodiments of the invention, the second member of the embodiment shown in FIGS. 1–6 is secured to the first member by a plurality of securing means distributed at two or preferably more longitudinally spaced locations along the co-extending portions of the first and second members and intermediate the ends of said members. These securing means perform the function of substantially inhibiting or limiting relative longitudinal movement of the first and second members at the aforementioned locations while providing for such movement between such locations. According to certain preferred embodiments, the securing means are fasteners which may or may not extend, but preferably do extend, laterally through the first member.

The invention includes embodiments in which the securing means are members which do or do not extend laterally from the second member through apertures formed in the first member; however, among the most preferred embodiments of the invention are those in which there are securing means extending laterally from the second member through apertures formed in the first member. Thus, in some of the most preferred embodiments of the invention, the securing means comprise projecting shanks or loops, and in certain embodiments these are preferably metallic loop chain links secured to a chain, such as chain 15, constituting the second member.

The use of such metallic loop chain links is exemplified in FIGS. 2-6 in which the securing means include extra chain links 16 and 17 which are not part of chain 15, per se, but are attached thereto as may be best seen in FIGS. 2-4. Note that the chain link securing means 16 and 17 are distributed at two spaced locations 18 and 19 along the coextending portions of the first and second members 14 and 15 and intermediate the ends of said members. In FIGS. 2 and 3, foreshortened to permit the embodiment to be illustrated on a larger scale, the links 16 and 17 are shown to be quite close to the ends of the user-stretchable portions of the assembly. As shown, link 16 is separated from one of said ends only by one full link, while link 17 is separated from the other end by only two full links. Typically, where the securing means included only two links, they would each be separated from the ends of the stretchable portion of the assembly by a larger number of links of chain 15; also, preferably, the links would be placed so that each link would be approximately equidistant between the other link and the nearest end of the user stretchable portion of the assembly. However, it is preferred that the cargo strap assemblies of the invention include 3 or more, preferably 4 or more and still preferably 5 or more securing means, and therefore will preferably include corresponding numbers of links 16 or 17. As the number of securing means and links 16/17 increases, the distance between the end of the stretchable portion of the assembly and the nearest link 16/17 becomes less important.

Each of the chain link securing means 16 and 17 is held within and extends laterally from a selected link 23 of chain 15. Using link 17 as an example, its first end 20 has a keeper 21 secured within it by welds 22. Keeper 21 extends generally perpendicular to the loop defined by link 17. Extra link 17 and keeper 21 are viewed from the side in FIG. 2. In FIG. 3 the apparatus of FIG. 2 has been rotated 90° about its longitudinal axis so that link 17 is shown from the top, keeper 21 being shown partly with dotted lines. This is because in FIG. 3 a portion of the keeper is below link 23 as better shown in FIG. 4, which is transverse cross-section of FIG. 3 taken along section line 4-4 of FIG. 3. Keeper 21 is nearly as long as the overall width of chain link 23 when the latter is viewed in plan view (as in FIG. 3); see also the sectional view in FIG. 4. Abutment of the link first end 20 against inner wall 24 of tube 14 and abutment of keeper 21 against the adjoining face of link 23 maintains the position of link 17 so that its central portion 25 extends laterally from chain 15 through aperture 26 in the tube wall so that the second end 27 of link 17 is held outside tube 14.

In this embodiment, the securing means includes not only the extra chain link 17 described above, but also the walls of aperture 26. In this embodiment, the function of substantially inhibiting or limiting relative longitudinal movement of the first and second members is performed by abutment between the walls of aperture 26 and the central portion 25 of extra link 17, which abutment may be present in the device as manufactured or as it is stretched for application to the cargo or as portions of the assembly undergo relative movement on failure of the first member. To facilitate such abutment, it is preferred that aperture 26 be somewhat undersized relative to the width of extra link 17, so that the walls of the aperture will grip or clasp central portion 25 of that link.

While the foregoing embodiment of the securing means employs extra chain links, such as 16 and 17, which are not part of the chain 15, it is possible to perform the same function with links which are a part of chain 15. This is briefly illustrated by FIG. 5 in which first link 31 and adjacent second and third links 32 and 33 are all part of chain 15. It should be understood that first link 31 is substituted for link 17 of FIGS. 2-4 and protrudes through aperture 26 with second and third links 32 being within tube 14. The arrangement in FIG. 5 may be readily formed by turning selected links 31 in a chain 15 so that they extend laterally as shown in FIG. 5, crimping the links 31 to provide them with a central contracted portion 34 and forming a barrier, e.g. a welded bridge 35 in the central portion 34 to divide link 31 into first and second loops 36 and 37. First loop 36 will be located inside tube 14 and will mesh with the second and third adjacent links 32 and 33, while second loop 37 will protrude outside tube 14 through aperture 26 in a manner similar to the second end 27 of the extra link 17 used in the embodiments of FIGS. 2-4. Just as the walls of aperture 26 grip the central portion 25 of link 17 in FIGS. 2-4, the walls of that aperture will also grip the central contracted portion 34 of first link 31. Link 31 is representative of a plurality of such links which will be included in the assembly and which will thus be capable of providing the safety function described above.

Preferred embodiments of the invention include attachment means, members provided at one or both ends of the cargo strap assembly or at another location along the length of the strap, connectable to an object (including the strap itself) a cargo carrier, such as a rack or platform, or to the cargo. These various forms of connection are useful in applying the strap in such a manner that it at least partly surrounds the cargo and binds the cargo to itself, to a cargo carrier, and/or to another object. Preferred forms of attachment means include devices which are attachable to whatever securing means are employed, and more preferably to securing means in the form of free looped ends extending from an outer surface of the assembly, the attachment means being selectively connectable to such free looped ends for attaching the strap to itself. Particularly preferred embodiments are those in which the securing means include members extending through the outer surface of the assembly and the attachment means is selectively connectable to one of said members for attaching the strap to itself. Exemplary attachment means are shown in FIGS. 2, 3 and 6.

While the attachment means may take a variety of forms, a preferred example is a metal hook 42 shown in FIGS. 2 and 3 which includes nose portion 43, shank portion 44 and loop portion 45, the latter being secured to the first end 7 of the cargo strap assembly 1. These same Figures illustrate that the second attachment means, where provided, may also take a variety of forms and need not necessarily employ the same structure as the first attachment means. Thus in this embodiment the second attachment means is an attachment ring 46 which is secured to second end 9 of the assembly.

Attachment ring 46 and loop portion 45 of hook 42 are both connected with their respective ends of assembly 1 in a similar manner which has been illustrated with ring 46 in FIG. 6. Ring 46 and loop 45 each pass through a pair of openings 47 and 48 at their respective ends of tube 14. Loop 45 and ring 46 also pass through end links 49 and 50 respectively of chain 15. At each end of the assembly, a terminal portion 51 of tube 14 is forced through the central opening of an inner binding ring 52, folded back over the outer surface of inner ring 52 and clamped in place with the assistance of an outer binding ring 53. Ring 53 preferably has an interference fit; its inner diameter is preferably less than the outer diameter of the folded over terminal portion 51 and is preferably also less than the outer diameter of inner ring 52.

The attachment means may be mounted to the assembly by direct or indirect connection to the first or second member or to both of them. Preferably, the attachment means is mounted by direct connection to an end of the first member or by direct connection to an end of the second member, and most preferably by direct connection to ends of both the first and second members as illustrated by the present embodiment.

According to a particularly preferred embodiment, the attachment means includes either a keyed or combination lock or means for applying such a lock to the attachment means and for preventing disconnection of the attachment means from the securing means without opening of said lock. Metal hook 42, constituting the first attachment means of the embodiment of FIGS. 2 through 6, is an example of means for applying a lock to the attachment means. In this connection nose portion 43 of hook 42 has a flattened bill 57 having in it a hole 60 of a size appropriate for insertion of the shank 59 of a keyed or combination padlock 58. After the nose portion has been connected with the securing means, such as by passing bill 57 through an opening in the securing means, such as through second loop 37 of link 31 of FIG. 5, or through the protruding end of link 17 of FIG. 2, as illustrated in FIG. 1, the shank 59 of the padlock may be passed both through hole 60 and opening 61 in loop portion 45, thus effectively preventing detachment of the hook from the securing means. Such an arrangement provides a measure of security to valuable cargo secured to a roof top carrier on an unattended vehicle.

Fabrication of the embodiment of FIGS. 1-6 begins with cutting tube 14 to length, e.g. 1.0 meter. Apertures 26 are then formed therein at distance intervals corresponding to the desired spacing of the securing means. Preferably, these intervals are substantially uniform in part or all of the length of the assembly. Also, preferably, at least a portion of the holes for the securing means are distributed along the first member in a ratio of about 1 to about 4 of such holes per 20 cm. of length of the tube, measured with that member in a relaxed condition. This will result in at least a portion of the securing means being distributed along the length of the coextending portions of the first and second members in a ratio of about 1 to about 4 securing means per 20 cm. of length of the co-extending portions, also measured in the relaxed condition. More preferably, the securing means are distributed along such co-extending portions in a ratio of about 1 securing means per 10 cm. of length under relaxed conditions.

The second member is prepared by installation of links 17 or 31 at appropriate intervals along the length of a chain 15 which may for example have a length of about 1.2 meters or more. In positioning the links 17 or 31, it must be remembered that their positions along the chain must correspond with the locations of apertures 26 with the assembly in a relaxed condition, i.e. with the chain links telescoped so that the end-to-end distance of the chain corresponds with its end-to-end distance when the assembly is in a non-extended condition.

Using a pulling wire which attaches at one end to a fixed object, passes through the length of tube 14 and connects to one of the end links of chain 15, tube 14 is drawn into surrounding relationship with the chain, stretching tube 14 as necessary and working the chain links within the tube 14 as necessary until the links 17 or 31 are opposite their respective apertures 26, through which they may be drawn with the aid of a small hook, pliers or the like. The attachment means may then be secured to each end of the assembly as shown in FIGS. 2 and 3 and as described above.

The first member, second member and securing means, as above described, cooperate to perform a failsafe function in the assembly. This safety feature is provided by the linking of the first and second members to one another at a plurality of longitudinally spaced locations by means of the projecting loops. This limits relative longitudinal movement of the first and second members in the vicinity of a break to a distance which is a relatively small fraction of the overall length of the strap, and thus ensures retention of a sufficient amount of restoring force to hold the cargo in place.

As an illustration of this fail-safe function, assume that the assembly is stretched around a cargo object as shown in FIG. 1. Assume further that the first member, elastomeric rubber tube 14, has been weakened through extended exposure to the effects of sunlight and/or atmospheric ozone and oxygen, and that it fails, i.e. breaks, at any position along its length, such as between a pair of securing means. Because the securing means connect the remaining portions of the tube 14 to the chain 15 on at least one and usually both sides of the break, such breakage will not result in a complete loss of restoring force, thus providing some reserve restoring force to maintain tension throughout the length of the assembly, including that portion of the chain extending between the above-mentioned pair of securing means.

This safety factor is enhanced when the cargo strap is applied to the cargo at an overall length approaching its maximum extension. This not only increases the amount of reserve restoring force available, but also minimizes the slack in the interval of chain between the pair of securing means where the break occurs. This, in turn, restricts the amount of relaxation that can occur in the undamaged portions of the first member, thus maximizing the amount of retained restoring force in those portions and throughout the assembly.

Thus, assuming that one uses a first member providing adequate restoring force, the cargo strap can still be effective in holding the cargo in pace in the event of a break in the first member. For example, if the first member is being used to hold a surf board, sail board, or other heavy and bulky object on a roof top carrier, the safety factor afforded by the invention will tend to reduce the likelihood that a break in the first member will be followed by complete detachment of the cargo and by the cargo becoming airborne and damaging a following vehicle or injuring its occupants, such as by penetrating the windshield of the following vehicle.

Additional important advantages of the embodiment shown in FIGS. 1-6 are that it can be locked and is adjustable. It can be locked to itself or possibly to the vehicle rack. To remove the strap without unlocking it could require the use of bolt cutters to cut the chain and a sharp knife to cut the rubber. The strap can be adjusted to various lengths for different cargo sizes and for different tensions or restoring forces. This adjustability is gained by providing the spaced loops at predetermined locations along the length of the strap, at which the strap can be attached to itself via the projecting loops.

Another advantage provided by the first member is that it guides and confines the second member as the strap is transitions from a tensioned condition to a relaxed condition and visa versa. This prevents the second member from tangling with adjacent items and from scratching the vehicle and/or cargo. While the first member is providing the necessary force to hold the cargo in place, it is also provides a cushion between the cargo and second member. This prevents the second member from damaging fragile cargo such as a fiberglass surfboard.

The second member not only provides for lockability, it also makes the strap much stronger than existing elastic straps. While providing this strength, when fully extended, the second member also prevents breakage of the first member by limiting the length the first member can be stretched. The second member provides for a medium for attaching the projecting loops. The strap is flexible and thus conforms to most cargo shapes. The strap can be used independently of any particular rack and only needs a load bar to which one can secure it. It can be used either exclusively as a cargo strap or solely as a chain and lock. The hook on the end provides the flexibility to lock the strap to a vehicle rack or simply attach it to the rack, cargo or itself.

The projecting loops not only provide for adjustability and arrest failure of the first member, but also prevent the strap from rolling, thus making it difficult to slide cargo from between the car top carrier and the strap. The projecting loops can also be used as tie-down points, for example to tie down a tarp. To deter theft, the projecting loops also make it difficult to release tension of the elastic by the cutting of the first member. To release a sufficient amount of tension to slide the cargo between the horizontal load and the strap, the first member would have to be cut through, between the securing means, in several locations.

The primary materials, i.e. elastic tubing and chain, can be cut to length from "continuous" stock. Therefore, significant economies can be attained in the manufacture of the article.

FIGS. 7-11

This embodiment is similar to that of FIGS. 1-6, except that it has modified forms of securing and attachment means as noted below and in FIGS. 7-11. This embodiment is currently considered to represent the best mode of carrying out the invention. As in the preceding description, this cargo strap assembly 1 includes a first end 7 and second end 9. In this embodiment the elongated stretchable first member and elongated second member are an EPDM rubber tube 14 and metal chain 15 identical to those used in the previous embodiment. Here again, assembly 1 and tube 14 are shown in tensioned condition with the tube 14 surrounding the chain 15 in close fitting engagement therewith, the chain being in its fully extended condition. Here again, securing means are provided at a plurality of locations as illustrated in FIG. 7, a single representative example of such securing means being shown in FIG. 8.

In FIGS. 7 and 8, the securing means include pins 65, the mid-portions 66 of which extend through the central openings 67 of chain links 68 of chain 15. Capture of the heads 69 of pins 65 between chain links 68 and the inner wall 24 of tube 14 cause the pin mid-portions 66 to extend laterally from chain 15 through apertures 26 in the tube wall, such apertures preferably being slightly undersized to grip mid-portions 66. Thus, mid-portions 66 of pin 65 and the walls of apertures 26 cooperate, as in the prior embodiment, to substantially inhibit or limit relative longitudinal movement of the first and second members; i.e. they constitute the securing means of the present embodiment.

While the outer ends of pins 65 may have any desired configuration, such as for example a loop, they preferably include a knob 70 or other member of enlarged transverse cross-section as compared to that of the mid-portion 66. Such a knob or other enlarged end is particularly useful in engaging the securing means with the preferred form of attachment means included in this embodiment. FIGS. 10 and 11 are detailed views of the side and top of pin 65.

The attachment means of the present embodiment appears in FIGS. 7, 8, 9A and 9B, and is secured to the tube 14 and chain 15 in a manner analogous to that used in the prior embodiment. FIG. 7 shows the assembly in perspective, the first attachment means 74 and second attachment means 87 constituting the first and second ends of the assembly. FIG. 8 is similar to a portion of FIG. 1 in that it shows attachment means 74 secured to an intermediate portion of the cargo strap assembly of FIG. 7, all but short portions of the length of the cargo strap having been omitted from FIG. 8 in order that it may be drawn to a larger scale. FIGS. 9A and 9B both show first attachment means 74 and connected end portions of the first and second members, the two views differing from one another by virtue of rotation of the assembly through an arc of 90° about its longitudinal axis. As shown in FIGS. 7-9B, first attachment means 74 includes a tubular metallic extension 75 of substantially the same diameter as rubber tube 14. Tubular extension 75 has a first end 76, an intermediate portion 77 and a second end 78, the first end being adjacent to and connected with an end of the rubber tube 14 and with the corresponding end of chain 15. As in the prior embodiment, tube 14 has a terminal portion 51 which is forced through and then folded back over the exterior of a collar 79. Preferably the inner surface 80 of tubular extension 75 has an interference fit with the folded terminal portion 51; i.e. the inner surface 80 has a smaller diameter than the outer diameter of folded back terminal portion 51. Tubular extension 75 is connected with an end link 49 of chain 15 by a retaining pin 81 which passes through the tubular extension and preferably also through collar 79 to assist in holding terminal portion 51 in place against inner surface 80.

Within intermediate portion 77 of tubular extension 75 is a receptacle for receiving and retaining the securing means, more specifically knob 70 of pin 65. Such receptacle may for example be a keyhole receptacle 82 having a wide portion, an opening slightly larger than knob 70, to permit insertion of the knob. The remainder of receptacle 82 is a narrow portion, an opening of smaller width than knob 70 and slightly larger than the diameter of the pin mid-portion 66. The wide and narrow portions 83 and 84 of receptacle 82 are in communication with one another for passage of the securing means back and forth between them, while preventing withdrawal of knob 70 through narrow portion 84.

Wide and narrow portions 83 and 84 are preferably oriented with the narrow and wide portions relatively further from and nearer tube 14, whereby the restoring force generated by the assembly tends to retain knob 70. However, the need for such orientation will be obviated if other means are provided for maintaining knob 70 within the narrow portion of the receptacle. This may for example be accomplished with other slot configurations or through the use of additional locking means. It is also contemplated and preferred to use the above-described orientation of the narrow and wide portions in conjunction with an optional locking arrangement, thereby utilizing the restoring force to hold the attachment means in place on the securing means while the lock is applied or engaged.

An optional locking arrangement included in this embodiment comprises a rotatable shutter 85 controlled by tumbler lock 86 which may be rotated to block or unblock the wide portion 83 of receptacle 82. The upper or outer surface of shutter 85 appears in open position within the outline of wide portion 83 in FIG. 9B and it may be rotated, under control of lock 86, to a closed position shown in FIGS. 8 and 9A.

As can be seen from the foregoing description, this embodiment provides attachment means which can be selectively attached to plural securing means which are laterally extending members connected to a second member and which have knobbed extensions which protrude through apertures formed in a first member surrounding the second member.

The manufacturing procedure for this embodiment is substantially the same as that for the embodiment of FIGS. 1-6. However, in this embodiment, the pins 65 are substituted for the links 17 or 31. The mode of operation of this embodiment is similar to that described above in conjunction with FIGS. 1-6, except for the connecting of the attachment means to the securing means; and the manner of performing this operation is believed to be clear from the drawings, especially from FIGS. 9A and 9B.

The foregoing attachment means readily cooperates with specially modified roof-top carriers. For example, upright legs 5 of carrier 3 (see FIG. 1) may be equipped with protruding knobbed pins (not shown) similar to pins 65 of FIGS. 7-10 (without heads 69) to which attachment means 74 may be attached via receptacle 82. Thus, one end of the assembly may be directly connected to the roof-top carrier 3.

Among the advantages of the embodiment shown in FIGS. 7-11 is the fact that the key hole receptacle and pin minimize the movement necessary to attach the strap to itself or another pin (see FIG. 10). This advantage of minimum movement is especially important when considering that, at the moment of attaching the end, the operator may be exerting considerable effort to stretch the strap. After securing the strap a simple turn of a key locks the end to the strap or pin and no time is consumed attaching a separate padlock. A significant economic advantage is gained by using an enclosure (tubular extension) to house both the locking mechanism and the rotatable shutter, plus the hooking means (key hole receptacle), and the attachment means for the elastic and chain. The key hole receptacle is also structurally stronger than a hook. There is no need to purchase a separate lock.

An additional advantage of this embodiment is that it can readily be provided with locks on both ends. Therefore, the strap can be left locked and adjusted to the desired length and tension on the car top carrier, and ready for immediate use. The apertures in the rubber through which the pins (FIG. 10) extend are small and bear against a round, smooth shank of the securing means, which assists in maintaining the integrity of the elastic tube. Also, in this embodiment there is no hook to inflict a puncture wound on the user upon inadvertent release and snapping back of the strap from an extended position.

All of the advantages stated in the description of advantages for the embodiment of FIGS. 1-6 hold true for that of FIGS. 7-11, except for the capability of attaching the hook to a car top carrier load bar or to the cargo.

FIGS. 12-17

These figures depict cargo strap assembly 91 having first and second ends 92 and 93 and comprising an elongated stretchable first member and an elongated second member. However, in this embodiment, the relationships of the first and second members have been reversed.

As in the prior embodiments, the first member may take a variety of forms, including elastomeric bands or tubes, of any suitable transverse cross-section, including circular, oval, rectangular and other shapes, of rubbery material, such as rubber or urethane. However, for purposes of this embodiment, the most preferred form of stretchable first member is a band 94 of synthetic rubber having the properties described above in connection with FIGS. 1-6 and having a rectangular or trapezoidal cross-section similar to that found in an ordinary rubber cargo strap. However in this embodiment, the first member is surrounded by the second member.

Any form or structure having the requisite properties and capabilities described above may be employed as a second member in this embodiment. However, the preferred form of second member is a woven tubular member 95 composed of helically woven filaments 96 which afford extension of the second member by a change in the helix angle 97 of said filaments. In common with the prior embodiments, securing means 98 (to be described in greater detail below) secure the co-extending portions of the first and second member at two or more longitudinally spaced locations for substantially inhibiting or limiting relative longitudinal movement of the first and second members at said locations while providing for such movement between such locations.

A preferred form of helically woven filaments is a tubular structure in which the filaments are spiralled in an interlaced fashion around the central void of the tubular structure with balanced proportions of the filaments having left and right hands respectively. In such structure, the weave of the filaments should not be excessively tight, in order to afford relative longitudinal slippage between adjacent fibers to vary the helix angle of the structure upon contraction of its cross-section and/or extension of its length. Such extension may or may not involve some elastic stretching of the filaments, but it is preferred that the filament materials and their arrangement in the tubular member should be such as to make them far more resistant to elastic stretching (as distinguished from lengthening by contraction and change in helix angle) than the first member; more specifically, it is preferred that the filament material having a far higher modulus of elasticity than the rubbery material of the first member.

The most preferred filaments are of high tensile strength, abrasion resistant polymeric materials such as polypropylene, Aramid, nylon and the like. An exemplary but preferred structure is formed by spinning long blank fibers whose thickness roughly compares with that of human hair into strands of about 1 to about 1.2 mm. in diameter, twisting the strands into twisted pairs of about 2 to about 2.5 mm. in diameter, assembling sets which contain two of such twisted pairs side by side and then weaving 16 of these sets into a hollow tubular member which is composed of 8 sets each of left and right hand respectively, the completed tubular member having an outside diameter of about 2 to about 2.5 cm. when compressed lengthwise to the point at which the helix angle of the sets, measured relative to a plane perpendicular to the central, longitudinal axis of the tubular member, is about 18°. At this helix angle, the weave is loose enough so that each woven set, although normally having no gap between itself and the adjoining sets, can be readily pried apart from an adjoining set with light to moderate finger pressure. When the length or end-to-end distance of this structure is increased without stretching of the fibers, by means of contraction of the diameter of the tube, adjacent sets readily undergo relative longitudinal movement with one another and the helix angle can for example increase to about 55°.

In FIGS. 12 and 13, assembly 91 is shown in relaxed condition with tubular member 95 surrounding band 94 in close proximity thereto. However, there is sufficient lateral clearance between the tubular member and the band to afford opportunity for the above indicated amount of extension of the assembly. Such extension is accompanied by the above mentioned change in the helix angle of the filaments and by contraction of the inner surface of the tubular member, without the necessity for compression of the first member by the second member.

There is longitudinal "slack" (excess length) in the second member 95 between each adjacent pair of securing means 98. When the assembly is extended to apply it to a cargo object, such excess length can be extended and distributed over the increasing distances between the pairs of securing means 98 which are secured to both the first and second members and are therefore drawn apart as the first member stretches and the assembly extends. In this way, the end-to-end distance of the second member 95 is increased. Such increase in end-to-end distance or extension of the second member requires application of less force, typically substantially less or very much less force, than is required to stretch the first member.

During the process of extension or increase in end-to-end distance of the second member described above, the first and second members will preferably both contract in cross-section. It is preferred to select a second member whose rate of contraction per unit of extension of the assembly is sufficient to cause circumferential clamping of the tubular or second member 95 about the girth of the band or first member 94 as assembly extension approaches the breaking elongation of the first member (as manufactured). This arrangement makes it possible for the second and first members to cooperate so that the respective extension and elongation of the second and first members can be halted prior to reaching the breaking elongation of the first member. For this purpose, a second member whose rate of contraction exceeds that of the first is particularly useful and preferred.

Securing means 98 may take any suitable form, however for embodiments of the invention having an inner elastomeric band as the first member and a surrounded woven tubular structure as the second member, the preferred form of securing means is a series of loops which surround and circumferentially clasp the second member against the outer surface of the first member. In the particularly preferred embodiment disclosed in FIGS. 12-17, the securing means 98 are closed loops which pass through and surround the first and second members and have free looped ends extending from an outer surface of the assembly. The closed loops may be continuous bands or may be formed of elongated non-continuous bands having first and second portions joined together in overlapping relationship to form the loops. The free looped ends of such non-continuous bands preferably also extend through apertures in the overlapping first and second portions of the bands.

The illustrations of the foregoing may be found in FIGS. 12-17 in which the aforementioned closed loop is formed from a thin woven fabric band 102 which may for example be woven of nylon filaments. Band 102 has first and second portions or halves 103 and 104 which respectively include ends 105 and 106. Near each end of band 102 is a round hole 107,108 having its perimeter fused to prevent unravelling of the woven material adjacent these holes. See FIG. 14. As illustrated in FIG. 15, band 102 is formed into a ring 109 which surrounds cargo strap assembly 91 with the holes 107 and 108 coinciding with one another and aligned with a similar hole 110 in assembly 91. With the aid of a rod or other pushing tool (not shown) the lower portion 111 of ring 109 is then forced up through hole 110 in assembly 91 and through holes 107 and 108 in upper portion 112 of ring 109, resulting in formation of a free looped end 113 which protrudes upwardly from holes 107 and 108 beyond the outer surface 114 of the assembly. In this operation, the pushing tool follows lower portion 111 through holes 110, 108 and 107, pushing upward on the underside of free looped end 113 until it has been made as large as possible and those portions of ring 109 which still surround assembly 91 have been drawn as tight as possible. The appearance of the securing means and assembly from the bottom and side on completion of the foregoing operation are shown respectively in FIGS. 16 and 13. FIG. 17 is a schematic perspective view showing that, on completion of the foregoing operation, the single ring 109 has been converted to a three lobed Figure comprising free looped end 113, which extends beyond the outer surface of assembly 91 and clasping loops 115 and 116 which surround portions of the assembly located to either side of hold 110 (not shown in this Figure).

In common with prior embodiments, the embodiment of FIGS. 12-17 may also be provided with attachment means which may take any suitable form. In this embodiment it is preferred that the attachment means include a first attachment means which is a metal hook 120 having a nose portion 121 and a loop portion 122, the latter passing through a hole in to the assembly first end 92. Preferably, loop portion 122 passes through both the band 94 and surround woven structure 95 to provide a secure connection between all three parts. Such connection is facilitated by heavily impregnating end portion 123 of woven structure 95 with a stiff and heavy coating 124 of synthetic resin which immobilizes the ends of the filaments in tubular member 125 which may also be stitched closed and/or fused to further resist unravelling. The hook loop portion 120 passes through a hole 125 in coating 124, through the weave of the tubular member and through a conventional hole (not shown) in band 94, passing out the opposite side of the assembly in a similar manner. Typically, the metal hook will be formed from malleable steel rod having a diameter of about 0.4 to about 0.5 mm., which rod is forced through the above-mentioned holes and end portion of the assembly prior to completing formation of loop portion 122. The second attachment means may take any desired form but in this embodiment is preferably a second metal hook 126 which is formed and secured to the assembly in the same manner as metal hook 120.

Fabrication of this assembly begins with formation of holes in longitudinally spaced locations along the length of band 94 intermediate its ends, at the intended locations for the securing means. Such holes should be formed with smooth walls to minimize tendencies for propagation of cut growth radiating from the holes. Preferably, the holes are molded integrally in band 94 during the molding of such band, which may otherwise be performed in a conventional manner. Pins in the forming molds may be used to form the requisite holes at the securing means locations. The resultant band may then be inserted into a length of woven tubular member as above-described. A sufficient amount of length of the tubular member should be used to provide the above-mentioned "slack" in the second member. In order to accomplish this it may be necessary to employ a length of tubular member (as supplied) substantially in excess of the length of band 94, compressing tubular member 95 lengthwise as it is applied to the band. When using the preferred tubular member described in detail above, the tubular member will be compressed so that the helix angle of the sets of twisted pairs of filaments is about 18°, it being understood that this angle may vary considerably with tubular members of differing design. The securing means are then applied to maintain the desired longitudinal compression and helix angle of the tubular second member between each pair of securing means.

The resulting cargo strap assembly may be used in the same manner as that shown in FIG. 1 and the hooks 120 and 126 may be attached to the cargo to a load platform or to any of the free looped ends 113 of the securing means. The above-described safety factor is also provided by this embodiment, in that failure of band 94 between any pair of securing means will not result in loss of restoring force throughout the assembly; and the tighter the assembly is applied to the cargo upon initial installation, the greater will be the available reserve restoring force. The reserve restoring force stored in the first member between the ends of the assembly and the securing means on either side of the break may slightly further extend that portion of tubular member 95 bridging across the interval between the two securing means on either side of the break, but the restoring force in the undamaged portions of the assembly will typically be sufficient to tolerate this slight extension without a complete loss of restoring force and therefore will continue to hold the cargo in place with a somewhat diminished restoring force. Similar functions may be performed by alternative embodiments described in the remaining figures.

Safety, adjustability, and durability are the primary advantages of this embodiment. Safety is provided by linking the first and second members to one another by the securing means at longitudinally spaced locations along the strap. This limits the loss of elasticity, due to failure of the first member, to that portion of the strap which is between those securing means which are adjacent to the failure. Another safety feature is provided by the loops to which the end hooks can be attached. Thus, the user finds it easy to hook the strap end to the loop and does not have to compromise and attach the hook to the cargo, around the strap, or in some other location where it might slip off.

Adjustability is provided by the presence of many securing loops along the length of the strap. Not only can the user adjust the length of the strap to match his cargo size; he can also at the same time determine the proper amount of tension. Durability is gained by the protection given by the second member to the first member against chafing, weathering, and being stretched beyond its normal operating length. Additional durability is provided by the fact that the strap can still be used even after the failure of the first member.

The change in the helix angle of the second member keeps the second member in close proximity with the first, thus reducing the strap's interference with cargo and car top carrier and increasing the strap's ease of handling. The strength provided by the second member, when the strap is fully extended, is far beyond that of ordinary elastic straps. The structure of the loop not only provides for a secure place to attach the hook, but also incorporates a self-locking design. The more load on the loop the tighter the loop becomes around the strap. There are no rivets to fail, because the loop is attached to itself. The loop is made out of a woven fabric and thus can not scratch a car finish or cargo.

Figure 18:
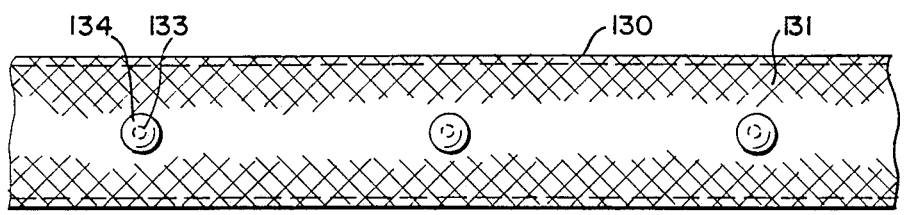
FIG. 18 is a top plan view of a portion of a cargo strap assembly in accordance with the invention.
Figure 19:
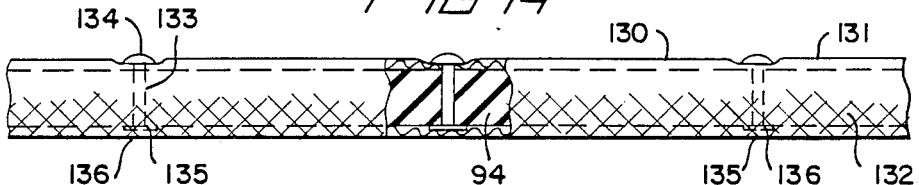
FIG. 19 is a side elevation of FIG. 18.

FIGS. 18 and 19

This embodiment is similar to that shown in FIGS. 12-17 in that the second member is again a woven tubular member surrounding the first member and having helically woven filaments. In the Figures, only a portion 130 of the cargo strap assembly is shown, it being understood that this assembly may have a length and other properties as described above, as well as any suitable form of fastening means, preferably, in this embodiment, the first member is a band 94 identical to that used in the embodiments of FIGS. 12-17. The tubular second member 131 which surrounds band 94 includes filaments 132 and is secured to the first member at longitudinally spaced locations by securing means 133.

The preferred filaments for use in this embodiment are of high tensile strength of stainless steel or monel wire, whose thickness may for example be about 0.5 mm. Sets which each contain 10 of these wires are assembled in side by side relationship, and the resultant sets are then woven into a hollow tubular member which is composed of 8 sets each of left and right hand, and which has a wall thickness of about 1 mm. When the outside diameter of this tubular member is about 2.0 to about 2.5 cm., the helix angle of the sets, measured relative to a plane perpendicular to the central, longitudinal axis of the tubular member, is about 20°. At this helix angle, the weave is loose enough so that each woven set, although normally having no gap or only a small gap between itself and the adjoining sets, can be readily pried apart from an adjoining set with light to moderate pressure using an awl or similar pointed tool. When the length or end-to-end distance of this structure is increased without stretching of the wires, by means of contraction of the diameter of the tube, adjacent sets readily undergo relative longitudinal movement with one another and the helix angle can for example increase to about 50°.

Assembly of this embodiment generally follows the procedure of the preceding embodiment, including the provision of slack in the braided wire tubular member. The securing means 133 assists in maintaining such slack in the distance intervals between the securing means when the assembly is in a relaxed condition. While the securing means may take any suitable form, in this embodiment they are rivets whose heads 134 are relatively large and whose clinched ends 135 are preferably clinched over washers 136 to prevent the heads and clinched ends from pulling through the woven wall of tubular member 131 and thereby disconnecting the first and second members from one another at that location. This embodiment operates in substantially the same manner as the previous embodiment, but the use of metallic wire for the tubular member provides somewhat greater security against cutting apart of the assembly by thieves, providing sturdy attachment means with appropriate locks are provided.

This embodiment is fail-safe in that if the elastic breaks, the effect of that break is limited to the portion of the assembly which is between the two rivets on either side of the break, because such rivets transfer force from the first member to the second member. This transfer of force also means the strap can still be useful after the first member fails. The second member provides protection for the first member against chaffing and weather. The second member provides a great amount of strength when the strap is fully extended. The change in the helix angle of the second member keeps the second member in close proximity to the first, thus reducing the strap's interference with cargo and car top carrier and increases the strap's ease of handling. The second member also limits the first member's elongation to well before the breaking point of the first member.

FIGS. 20–21

These Figures disclose an embodiment in which the securing means or protuberances on an outer surface of the first member, which protuberances do not extend through the first member but do project a sufficient distanced laterally from the surface of the first member for engaging an inner surface of the second member for substantially inhibiting or limiting relative longitudinal movement of the first and second members at the locations of the securing means in the event of rupture of the first member intermediate an adjacent or non-adjacent pair of such protuberances. While the protuberances may be separate elements applied to the first member after its initial formation, the protuberances are preferably integral with the first member, and in the absence of compression of the first member by the second member, project a sufficient distance from the surface of the first member for engaging the inner surface of the second member. While any suitable second member may be employed, the preferred second member for this embodiment is a woven tubular member, similar to that used in the embodiments of FIGS. 12–17 or 18–19, that surrounds the portion of the first member with which it co-extends and has helically woven filaments which afford longitudinal extension of the second member by a change in the helix angle of these filaments and an accompanying contraction of the inner surface of the tubular member. This embodiment is similar to the embodiments of FIGS. 12–17 and 18–19, in that the second member surrounds the first member, but an entirely different form of securing means is employed.

Figure 20:
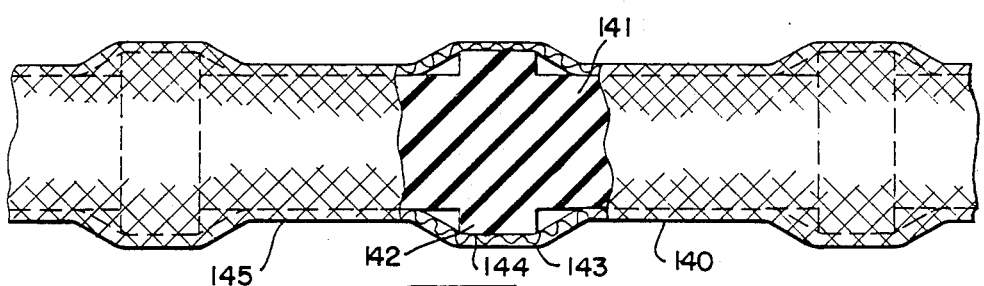
FIG. 20 is a top plan view, partly broken out, showing a portion of still another embodiment of the present invention.
Figure 21:
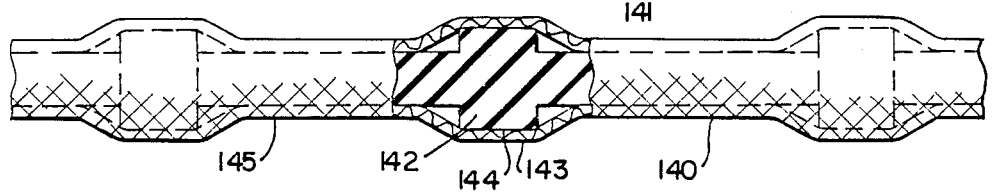
FIG. 21 is a side elevation of the embodiment of FIG. 20, again with a portion broken out.

Turning now to the Figures, FIGS. 20–21 depict a portion 140 of a cargo strap assembly, it being understood that the assembly will have the capabilities and properties described above and may be provided with attachment means as previously discussed. In this embodiment the first member is a band 141 of synthetic rubber having a generally rectangular cross-section and formed with integral collars 142 extending about its girth at spaced locations along the length of the band. Collars 142 constitute protuberances on outer surface 143 of band 141, and project a sufficient distance laterally from said surface for engaging an inner surface 144 of a tubular second member 145 similar to the tubular members 95 or 131 of FIGS. 12–17 or 18–19, the tubular member of FIGS. 12–17 being preferred for this embodiment. This embodiment is assembled in such a manner that with the assembly in an unstretched condition, collars 142 engage the inner surface 144 of tubular member 145.

In the event of rupture of the first member intermediate a pair of collars 142, their frictional contact with the adjoining inner surfaces 144 of tubular member 145 assists in retaining reserve restoring force within the assembly. Assuming the assembly, as applied to the cargo, has been extended to a length approaching its ultimate elongation, breakage of band 141 between a pair of integral collars 142 will result in a tendency for band 141 to draw away from the break on both sides of the break. Frictional engagement between the tubular member inner surface 144 and the collars 142 on either side of the break may cause some further extension of the length of tubular member 145 between these two collars, thus further reducing the diameter of tubular member 145 and increasing its grip on these collars. Such gripping action and the securing functions performed by the remaining integral collars, of which there are preferably at least 3, 4 or 5 and still more preferably about 5 to 10, assist in retaining the reserve restoring force which enables the cargo strap assembly to continue its cargo binding function notwithstanding the break in band 141.

The advantages of this embodiment are the same as in the embodiment shown in FIGS. 18 and 19 plus two important additions. First, the strap has no rivets and therefore no parts to scratch the cargo or vehicle's finish. Second, the strap can be made from "continuous" length stock materials, thereby gaining a significant economic advantage over straps that must be made in discrete lengths.

FIGS. 22–23

In this embodiment, neither of the first and second members is surrounded by the other. Rather, the first and second members run in essentially side-by-side relationship. Here, the first member may be of any desired material and have any suitable cross-section but preferably is an elastomeric synthetic rubber band 149 of rectangular cross-section having holes formed in it at the same distance intervals discussed above in conjunction with FIGS. 12–17. The second member may be of any form, such as rope, wire, chain, a braided tubular member or the like, which is capable of extension in the manner described above; but for this embodiment the preferred second member is multi-strand, flexible, non-kinking, wire rope 151. In this embodiment rivets 152 serve as the securing means. These rivets may for example have diametral holes formed in their shank portions 153 immediately beneath their heads 154. Band 149 has holes 150 distributed at appropriate distance intervals, as described in the preceding embodiment which receive the rivet shank portions 153.

In the assembly of this embodiment, a length of wire rope 151 exceeding the length of band 149 (in the relaxed condition) by a ratio of at least about 1.2 is laid down alongside the band. A number of rivets 152 are threaded onto the wire rope. One by one, rivets 152 are clinched over washers 155 at their clinched ends 156, so that the rivet heads 154 are tightly drawn down against and a short distance into upper surface 157 of band 149. In this manner, that portion of wire rope 151, which is adjacent each rivet 152 is also mashed into the upper surface of the band. The objective here is to prevent relative longitudinal motion of the band and the wire rope at each rivet location, thereby performing the function of securing means. Slack provided in wire rope 151 between each adjacent pair of rivets can be formed into a loop 158. If desired, the wire rope may be provided with an outer jacket or coating of synthetic resinous material to protect the wire rope or to prevent it from scratching objects with which it comes into contact.

Safety is a main advantage of this embodiment. If the first member breaks, the strap maintains a majority of its cargo binding force. This is done by forming a bridge over the broken portion of the first member by the second member. The second member then transfers the load from the first member to the second member and back again by means of the rivets on either side of the break. This embodiment also provides for a degree of security against theft, because the wire can not be cut by a knife.

FIGS. 24–25

Figure 22:
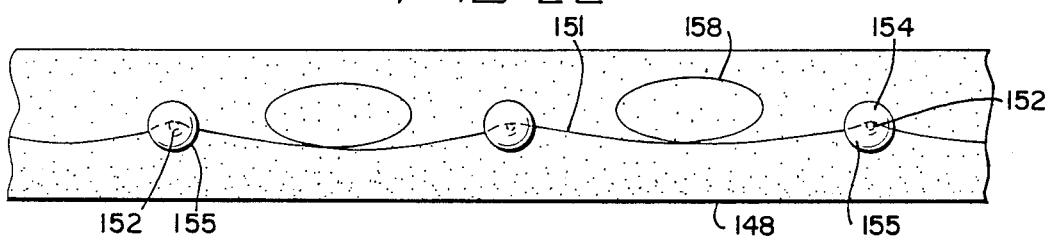
FIG. 22 is a top plan view of a portion of another embodiment of the invention.
Figure 23:
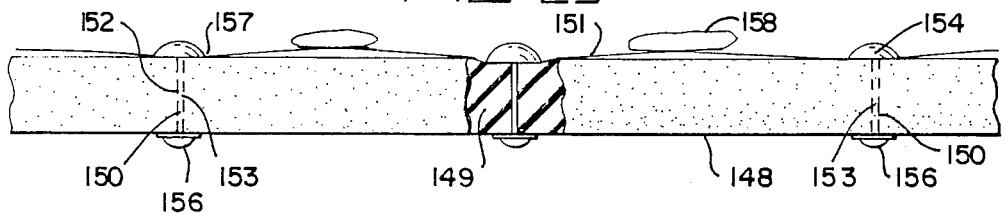
FIG. 23 is a side elevation of FIG. 22 with a portion broken out.
Figure 24:
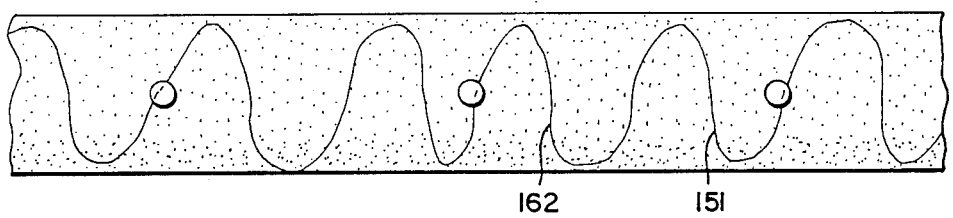
FIG. 24 is a top plan view of a portion of an additional embodiment of the invention.
Figure 25:
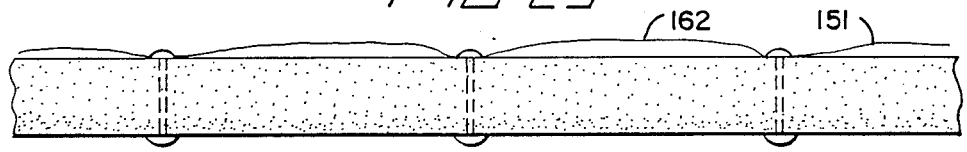
FIG. 25 is a side view of FIG. 24.

This embodiment is identical with that of FIGS. 22–23, except that the slack in wire rope 151, instead of being formed into circular loops 158 (FIGS. 22–23) is formed into undulating loops 162. The rope may be encouraged to return to its undulating shape upon relaxation by providing it with a resin outer layer or tube having a "memory" corresponding to the desired shape. This embodiment includes all the advantages of the embodiment shown in FIGS. 22 and 23. In addition, the first and second members stay in close proximity to one another due to the pattern of the wire rope.

FIGS. 26–28

Figure 26:
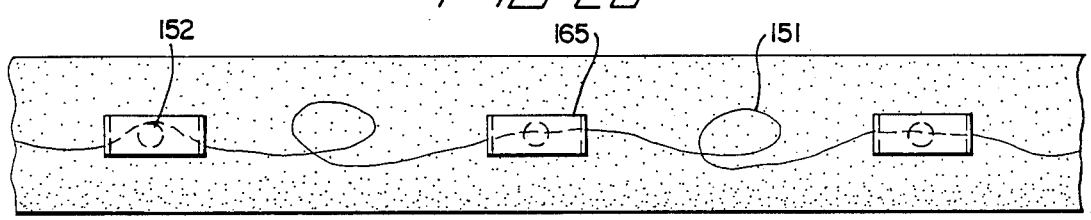
FIG. 26 is a top plan view of a portion of yet another embodiment the invention.
Figure 27:
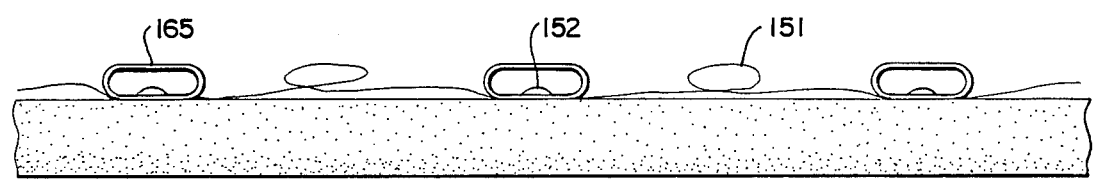
FIG. 27 is a side view of the subject matter of FIG. 26.
Figure 28:
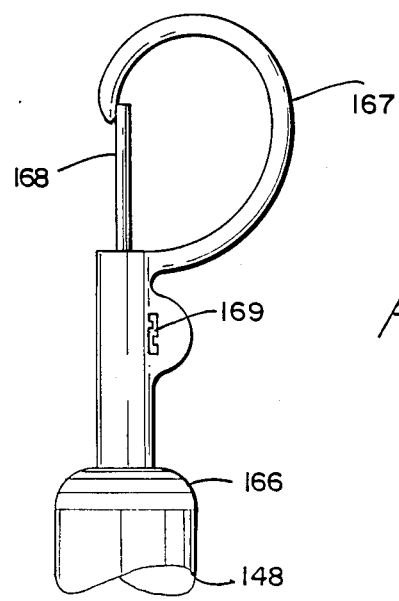
FIG. 28 is a top plan view of an end portion of the same embodiment of a cargo strap assembly shown in FIG. 26.

This embodiment is identical to that of FIGS. 22–23, except that in addition to securing wire rope 151, the rivets 152 also secure metallic loops 165 which project from the upper surface of assembly 148 as shown in FIGS. 26–27. FIG. 28 shows an end 166 of assembly 148 provided with attachment means in the form of a hook 167 provided with a reciprocable closure 168 whose opening and closing movements are controlled by a lock 169.

The advantages of this embodiment include all of the advantages of the embodiment shown in FIGS. 22 and 23. In addition, the metallic loops provides the user with the ability to adjust the length and tension of the strap, and at the same time the ability to lock the strap to itself (assuming a lockable end is used with the strap).

From the foregoing, it may be seen that the co-extending portions of the first and second members may have varying spatial relationships. These include embodiments in which either of said members may surround the other and embodiments in which they run alongside one another.

While in some embodiments the first and second members extend in substantially the same direction over a major portion of the length of the assembly, there are other embodiments, such as for example the embodiments depicted in FIGS. 22–27, in which the direction in which at leas portions of one of these members extends may be significantly different from the direction in which the other member is extending, at least when the assembly is in a relaxed condition. However, as will be found in the operation of the embodiments of FIGS. 22–27, portions of the first and second members which extend in different directions in a relaxed condition may be translated during extension of the assembly so that such portions eventually do extend in the same direction.

The most preferred embodiments are those in which the first and second members extend in substantially the same direction over a major portion of the length of the assembly in both relaxed and tensioned condition and in which one of said members surrounds the other. Nevertheless, those embodiments wherein the second member extends alongside of but does not surround the portion of the first member with which it coextends are considered to be useful for certain applications.

In embodiments similar to FIGS. 22–27, certain portions of the second member may not necessarily be held in close proximity to the first member, especially when the assembly is in a relaxed condition and there is available slack in the second member. For example, portions of the circular loops 158 or undulating loops 162 of the FIGS. 22–23 and 24–25 embodiments may extend away from the first member over some amount of lateral distance. In this connection, it is preferred that the first and second members, in a portion of the assembly which is of sufficient length to perform a cargo binding function, should be sufficiently close together so that their total lateral spacing, if any, is about 0.15 or less than the total length of the assembly, throughout said portion. Still more preferably, the first and second members should follow paths which are maintained in close proximity to one another substantially throughout the length of the assembly.

I claim:

1. A stretchable, flexible, fail-safe cargo strap assembly able to retain restoring force for holding a cargo object in place in the event of failure of a portion of the strap, said cargo strap comprising:
   I. an elongated, stretchable first member having the properties of
      A. generating restoring force when stretched from a relaxed condition to a tensioned condition,
      B. generating, without exceeding its breaking elongation (as manufactured), an amount of such force which is sufficient for performing a cargo binding function, including binding a cargo object together or to another object, and
      C. susceptibility to failure, leading to potential loss or damage to the cargo, as a result of overstressing or aging of the first member; and
   II. an elongated second member having a portion which
      A. coextends with at least a portion of said first member,
      B. is secured to said first member of a plurality of securing members distributed
         1. at two or more longitudinally spaced locations
         2. along the coextending portions of the first and second members and
         3. intermediate the ends of said members,
         4. for substantially inhibiting or limiting relative longitudinal movement of the first and second members at said locations while providing for such movement between such locations, thus providing, upon failure of the first member when in a stretched condition, reserve restoring force for maintaining tension in the cargo strap and continuing to restrain the cargo,
      C. is extendable, by stretching of said assembly, to an extended position in which
         1. The assembly is stretched sufficiently for performing a cargo binding function, and
         2. the end-to-end distance of the second member is at least about 1.2 times the end-to-end distance which the second member exhibits when the assembly is in an unstretched condition, and
      D. develops a greater resistance to extension said first member, but only after extension at least to said extended position.

2. A cargo strap assembly according to claim 1 which (as manufactured) will stretch to at least about 1.2 times its unstretched length when stretched by a force of 16 Kg., without breaking.

3. A cargo strap assembly according to claim 1 which (as manufactured) will stretch to at least about 1.5 times its unstretched length when stretched by a force of 16 Kg., without breaking.

4. A cargo strap assembly according to claim 1 which (as manufactured) will stretch to at least about 1.8 times its unstretched length when stretched by a force of 16 Kg., without breaking.

5. A cargo strap assembly according to claim 1 wherein said first member, when stretched to 1.4 times its unstretched length, generates a restoring force in the range of about 5 to about 50 Kg.

6. A cargo strap assembly according to claim 1 wherein said first member, when stretched to 1.4 times its unstretched length, generates a restoring force in the range of about 8 to about 30 Kg.

7. A cargo strap assembly according to claim 1 wherein said first member, when stretched to 1.4 times its unstretched length, generates a restoring force in the range of about 12 to about 22 Kg.

8. A cargo strap assembly according to claim 1 wherein said first member has a breaking elongation (as manufactured) which is about 1.5 or more times its length in relaxed condition.

9. A cargo strap assembly according to claim 1 wherein said first member has a breaking elongation (as manufactured) which is about 2 or more times its length in relaxed condition.

10. A cargo strap assembly according to claim 1 wherein said first member has a breaking elongation (as manufactured) which is about 2.5 or more times its length in relaxed condition.

11. A cargo strap assembly according to claim 1 wherein the first member has a breaking force (tensile, as manufactured) of at least about 30 Kg.

12. A cargo strap assembly according to claim 1 wherein the first member has a breaking force (tensile, as manufactured) of at least about 50 Kg.

13. A cargo strap assembly according to claim 1 wherein the first member has a breaking force (tensile, as manufactured) of at least about 80 Kg.

14. A cargo strap assembly according to claim 1 wherein said first member is formed of rubbery elastomeric material.

15. A cargo strap assembly according to claim 1 wherein said first member is in the form of a band.

16. A cargo strap assembly according to claim 1 wherein said first member is in the form of a tube.

17. A cargo strap assembly according to claim 14 wherein said first member is in the form of a band.

18. A cargo strap assembly according to claim 14 wherein said first member is in the form of a tube.

19. A cargo strap assembly according to claim 1 wherein the second member is a metal member which possesses substantially greater strength and resistance to elongation than the first member.

20. A cargo strap assembly according to claim 1 wherein the second member is a polymeric member which possesses substantially greater strength and resistance to elongation than the first member.

21. A cargo strap assembly according to claim 1 wherein the second member is a rope which possesses substantially greater strength and resistance to elongation than the first member.

22. A cargo strap assembly according to claim 1 wherein said second member is a woven tubular member having helically woven filaments which afford extension of the second member by a change in the helix angle of said filaments.

23. A cargo strap assembly according to claim 1 wherein the second member is a chain which possesses substantially greater strength and resistance to elongation than the first member.

24. A cargo strap assembly according to claim 1 Wherein the first and second members are held in close lateral proximity in a plurality of spaced positions distributed along their respective lengths.

25. A cargo strap assembly according to claim 1 wherein the second member has portions which are laterally spaced from the second member in intervals of longitudinal space between the securing members.

26. A cargo strap assembly according to claim 1 wherein the first and second members, in a portion of the assembly which is of sufficient length to perform a cargo binding function, have a lateral spacing which is maintained as a small fraction of said length, along said portion.

27. A cargo strap assembly according to claim 1 wherein the first and second members, in a portion of the assembly which is of sufficient length to perform a cargo binding function, are sufficiently close together so that their lateral spacing, if any, is about 0.15 or less of the total length of said assembly, throughout said portion.

28. A cargo strap assembly according to claim 1 wherein the first and second members extend in substantially the same direction over a major portion of the length of said assembly.

29. A cargo strap assembly according to claim 1 wherein the first and second member follow paths which are maintained in close proximity to one other substantially throughout the length of the assembly.

30. A cargo strap assembly according to claim 1 wherein the second member extends alongside of but does not surround the portion of the first member with which it coextends.

31. A cargo strap assembly according to claim 1 wherein the second member surrounds the portion of the first member with which it coextends.

32. A cargo strap assembly according to claim 1 wherein the second member is surrounded by the portion of the first member with which it coextends.

33. A cargo strap assembly according to claim 21 wherein the second member extends alongside of but does not surround the portion of the first member with which it coextends.

34. A cargo strap assembly according to claim 16 wherein the second member surrounds the portion of the first member with which it coextends.

35. A cargo strap assembly according to claim 22 wherein the second member surrounds the portion of the first member with which it coextends.

36. A cargo strap assembly according to claim 23 wherein the second member is surrounded by the portion of the first member with which it coextends.

37. A cargo strap assembly according to claim 1 wherein the securing means are fasteners which extend laterally through the first member.

38. A cargo strap assembly according to claim 1 wherein the securing means are protuberances on an outer surface of the first member, which do not extend through the first member but do project a sufficient distance laterally from the surface of the first member for engaging an inner surface of the second member for substantially inhibiting or limiting relative longitudinal movement of the first and second members at said locations in the event of rupture of the first member intermediate an adjacent or non-adjacent pair of said protuberances.

39. A cargo strap assembly according to claim 38 wherein said protuberances are integral with the first member and, in the absence of compression of the first member by the second member, project a sufficient distance from the surface of the first member for engaging the inner surface of the second member.

40. A cargo strap assembly according to claim 38 wherein the second member is a woven tubular member that surrounds the portion of the first member with which it coextends and has helically woven filaments which afford longitudinal extension of the second member by a change in the helix angle of said filaments and an accompanying contraction of the inner surface of the tubular member.

41. A cargo strap assembly according to claim 1 wherein the securing means are closed loops which pass through and surround the first and second members and have free looped ends extending from an outer surface of the assembly.

42. A cargo strap assembly according to claim 41 wherein the closed loops are continuous bands.

43. A cargo strap assembly according to claim 41 wherein the closed loops are formed of elongated non-continuous bands having first and second portions joined together in overlapping relationship to form said loops.

44. A cargo strap assembly according to claim 43 wherein the free looped ends also extend through apertures in the overlapping first and second portions of said bands.

45. A cargo strap assembly according to claim 32 wherein the securing means are members which extend laterally from the second member through apertures formed in the first member.

46. A cargo strap assembly according to claim 45 wherein the securing means are metallic loops.

47. A cargo strap assembly according to claim 46 wherein the second member is a chain.

48. A cargo strap assembly according to claim 47 wherein the securing means are chain links which extend laterally from said chain through apertures formed in the first member.

49. A cargo strap assembly according to claim 48 wherein the securing means are links of said chain.

50. A cargo strap assembly according to claim 48 wherein the securing means are chain links secured to said chain.

51. A cargo strap assembly according to claim 1 including three or more of said securing means.

52. A cargo strap assembly according to claim 1 including four or more of said securing means.

53. A cargo strap assembly according to claim 1 including five or more of said securing means.

54. A cargo strap assembly according to claim 1 wherein at least a portion of said securing means are distributed at substantially uniform distance intervals along the length of the coextending portions of the first and second members.

55. A cargo strap assembly according to claim 1 wherein all of said securing means are distributed at substantially uniform distance intervals along the length of the coextending portions of the first and second members.

56. A cargo strap assembly according to claim 1 wherein at least a portion of said securing means are distributed along the length of the coextending portions of the first and second members in a ratio of about one to about four securing means per 20 centimeters of length of said coextending portions.

57. A cargo strap assembly according to claim 1 wherein said securing means are distributed along the length of the coextending portions of the first and second members in a ratio of about one securing means per 10 centimeters of length of said coextending portions.

58. A cargo strap assembly according to claim 1 wherein said extendable property of said second member includes the capability of undergoing, in the assembly, an increase in distance between the ends of the second member by straightening, stretching and other modes of increasing the end-to-end distance of the second member, as measured along the path occupied by the assembly.

59. A cargo strap assembly according to claim 1 wherein the overall length of the user stretchable portion of said assembly, in its unstretched condition, is in the range of about 0.25 to about 4 meters.

60. A cargo strap assembly according to claim 1 wherein the overall length of the user stretchable portion of said assembly, in its unstretched condition, is in the range of about 0.25 to about 2 meters.

61. A cargo strap assembly according to claim 1 wherein the overall length of the user stretchable portion of said assembly, in its unstretched condition, is in the range of about 0.5 to about 1.25 meters.

62. A cargo strap assembly according to claim 1 wherein said second member is extendable to an extended position in which the end-to-end distance of the second member is in the range of about 1.2 to about 2.2 times the end-to-end distance which the second member exhibits when the assembly is in an unstretched condition.

63. A cargo strap assembly according to claim 1 wherein said second member is extendable to an extended position in which the end-to-end distance of the second member is in the range of about 1.3 to about 2 times the end-to-end distance which the second member exhibits when the assembly is in an unstretched condition.

64. A cargo strap assembly according to claim 1 wherein said second member is extendable to an extended position in which the end-to-end distance of the second member is in the range of about 1.5 to about 1.9 times the end-to-end distance which the second member exhibits when the assembly is in an unstretched condition.

65. A cargo strap assembly according to claim 1 wherein said second member develops a greater resistance to extension than said first member before the first member exceeds its breaking elongation (as manufactured).

66. A cargo strap assembly according to claim 1 wherein said cargo strap includes at each end thereof attachment means for securing the strap to itself or another object.

67. A cargo strap assembly according to claim 66 wherein said attachment means includes a hook.

68. A cargo strap assembly according to claim 66 wherein said attachment means includes a keyed or combination lock or means for applying such a lock to the attachment means and for preventing removal of the attachment means without opening said lock.

69. A cargo strap assembly according to claim 66 wherein said attachment means is mounted by direct connection to an end of the first member.

70. A cargo strap assembly according to claim 66 wherein said attachment means is mounted by direct connection to an end of the second member.

71. A cargo strap assembly according to claim 66 wherein said attachment means is mounted by direct connection to ends of both the first and second members.

72. A cargo strap assembly according to claim 66 wherein said attachment means is selectively connectable to said securing means for attaching one or both ends of the strap to selected locations on the strap intermediate its ends.

73. A cargo strap assembly according to claim 72 wherein said securing means include loop members extending from an outer surface of the assembly and said attachment means is selectively connectable to said loop members.

74. A cargo strap assembly according to claim 73 wherein said loop members are chain links which extend through the outer surface of the assembly and said attachment means is selectively connectable to said links.

75. A cargo strap assembly according to claim 73 wherein said securing means include shanks extending from within the assembly and said attachment means is selectively connectable to knobs on said shanks.

* * * * *